US012599531B2

(12) United States Patent
Varghese et al.

(10) Patent No.: US 12,599,531 B2
(45) **Date of Patent: \*Apr. 14, 2026**

(54) ACTUATOR FOR PHYSICAL THERAPY

(71) Applicant: Bioness Medical, Inc., Valencia, CA (US)

(72) Inventors: Rohit John Varghese, Austin, TX (US); Youngmok Yun, Austin, TX (US); William Wu, Austin, TX (US)

(73) Assignee: Bioness Medical, Inc., Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,200

(22) Filed: Nov. 17, 2023

(65) Prior Publication Data

US 2024/0082096 A1 Mar. 14, 2024

Related U.S. Application Data

(63) Continuation of application No. 17/502,144, filed on Oct. 15, 2021, which is a continuation of application
(Continued)

(51) Int. Cl.
$A61H\ 1/02$ (2006.01)
$B25J\ 9/00$ (2006.01)
(Continued)

(52) U.S. Cl.
CPC .............. *A61H 1/02* (2013.01); *A61H 1/0274* (2013.01); *B25J 9/0006* (2013.01); *B25J 9/1025* (2013.01);
(Continued)

(58) Field of Classification Search
CPC .................... A61H 1/02; A61H 1/0274; A61H 2001/0203; A61H 2001/0207;
(Continued)

(56) References Cited

U.S. PATENT DOCUMENTS 3,088,333 A 5/1963 Walton
3,214,999 A 11/1965 Lapp
(Continued)

FOREIGN PATENT DOCUMENTS

CA 2741362 A1 4/2010
EP 2404713 A1 1/2012
(Continued)

OTHER PUBLICATIONS

Torque Transmission, "What is a Speed Reducer? How does a Speed Reducer work?," https://www.torquetrans.com/blog/how-a-speed-reducer-works, 2020, 6 pages.
(Continued)

*Primary Examiner* — Justine R Yu
*Assistant Examiner* — Matthew D Ziegler
(74) *Attorney, Agent, or Firm* — Trop, Pruner & Hu, P.C.

(57) ABSTRACT

A robotic system comprising: a joint coupling a linkage to an additional linkage; and at least one cable; wherein the joint includes a motor having a shaft, a strain wave gear having a flexible member coupled to a circular spline, a conduit, and a bearing; wherein the motor is configured to rotate the shaft in a first direction and the strain wave gear is configured to rotate a rotatable member, the rotatable member including one of the flexible member or the circular spline; wherein the conduit is configured to rotate in response to rotation of the rotatable member; wherein the at least one cable passes through both the bearing and into the additional linkage but does not pass through either of the strain wave gear or the motor.

20 Claims, 24 Drawing Sheets

200

Related U.S. Application Data

No. 16/796,240, filed on Feb. 20, 2020, now Pat. No. 11,147,731.

(60) Provisional application No. 62/808,116, filed on Feb. 20, 2019.

(51) Int. Cl.

| | |
|---|---|
| *B25J 9/10* | (2006.01) |
| *B25J 9/16* | (2006.01) |
| *B25J 13/08* | (2006.01) |
| *B25J 19/00* | (2006.01) |

(52) U.S. Cl.
CPC .......... *B25J 9/1633* (2013.01); *B25J 13/085* (2013.01); *B25J 13/088* (2013.01); *B25J 19/0029* (2013.01); *A61H 2201/1215* (2013.01); *A61H 2201/149* (2013.01); *A61H 2201/1635* (2013.01); *A61H 2201/1659* (2013.01); *A61H 2201/5061* (2013.01)

(58) Field of Classification Search
CPC .... A61H 2001/0214; A61H 2201/1215; A61H 2201/149; A61H 2201/1635; A61H 2201/1659; A61H 2201/5061; B25J 9/0006; B25J 9/1025; B25J 9/1633; B25J 13/085; B25J 13/088; B25J 19/0029
See application file for complete search history.

(56) References Cited

U.S. PATENT DOCUMENTS

| | | | | |
|---|---|---|---|---|
| 4,265,150 | A | * | 5/1981 | Burford ................. B23Q 1/766 |
| | | | | 82/162 |
| 4,547,119 | A | | 10/1985 | Chance et al. |
| 4,864,888 | A | | 9/1989 | Iwata |
| 5,155,423 | A | | 10/1992 | Karlen et al. |
| 5,327,790 | A | | 7/1994 | Levin et al. |
| 6,492,807 | B2 | | 12/2002 | Spellman |
| 6,676,561 | B2 | | 1/2004 | Fritzer et al. |
| 7,140,994 | B2 | | 11/2006 | Mundis |
| 7,979,160 | B2 | | 7/2011 | Teaford et al. |
| 8,683,876 | B2 | | 4/2014 | Fujii et al. |
| 8,729,769 | B2 | | 5/2014 | Takeuchi |
| 9,895,087 | B2 | | 2/2018 | Lee et al. |
| 9,966,816 | B2 | | 5/2018 | Kokubo et al. |
| 10,143,570 | B2 | | 12/2018 | Herr et al. |
| 10,335,959 | B2 | | 7/2019 | Ogata |
| 10,463,560 | B2 | | 11/2019 | Deshpande et al. |
| 2011/0239788 | A1 | | 10/2011 | Nagasaka et al. |
| 2011/0314950 | A1 | | 12/2011 | Mamba |
| 2012/0286629 | A1 | | 11/2012 | Johnson et al. |
| 2016/0201783 | A1 | | 7/2016 | Miyake et al. |
| 2016/0296345 | A1 | | 10/2016 | Deshpande et al. |
| 2017/0184190 | A1 | | 6/2017 | Klassen |
| 2017/0321790 | A1 | | 11/2017 | Klassen et al. |
| 2018/0172121 | A1 | | 6/2018 | Potter et al. |
| 2018/0274646 | A1 | | 9/2018 | Sato et al. |
| 2019/0160658 | A1 | | 5/2019 | Hutter et al. |
| 2019/0222103 | A1 | | 7/2019 | Nedrehagen et al. |
| 2020/0281796 | A1 | | 9/2020 | Lakany et al. |

FOREIGN PATENT DOCUMENTS

| | | |
|---|---|---|
| EP | 3067164 A2 | 9/2016 |
| JP | 2010149214 A | 7/2010 |
| JP | 2012035372 A | 2/2012 |
| WO | 2007136803 A2 | 11/2007 |
| WO | 2017218661 A1 | 12/2017 |
| WO | 2018064709 A1 | 4/2018 |
| WO | 2019002906 A1 | 1/2019 |

OTHER PUBLICATIONS

Metromatics, "Reaction Torque Sensor," https://metromatics.com.au/product/reaction-torque-sensor/, 2020, 6 pages.

Realpars, "Difference Between Absolute and Incremental Encoders?," https://realpars.com/absolute-vs-incremental-encoder/, 2020, 23 pages.

Motion Control Tips, Danielle Collins, "FAQ: How do magnetic encoders work?," https://www.motioncontroltips.com/faq-how-do-magnetic-encoders-work/, Nov. 13, 2015, 9 pages.

Honeywell, "Model QWLC-8M, Miniature Reaction Torque Transducer," https://measurementsensors.honeywell.com/ProductDocuments/Torque/Model_QWLC-8M_Datasheet.pdf, Jun. 2008, 4 pages.

Honeywell, "Honeywell Sensing and Control, Sensors for Test and Measurement," https://measurementsensors.honeywell.com/Pages/Product.aspx?pid=QWLC-8M, Date Unknown, 2 pages.

Honeywell, "Honeywell Sensing and Control, Sensors for Test and Measurement, Ways to Measure the Force Acting on a Rotating Shaft," https://measurementsensors.honeywell.com/techresources/appnotes/Pages/Ways_to_Measure_the_Force_Acting_on_a_Rotating_Shaft.aspx, Copyright 2004-2020, 3 pages.

Wikipedia, "Belleville washer," https://en.wikipedia.org/wiki/Belleville_washer, last edited on Jan. 6, 2020, 6 pages.

Wikipedia, "Harmonic drive," https://en.wikipedia.org/wiki/Harmonic_drive, last edited on Feb. 9, 2019, 4 pages.

Wiki How, "How to Determine Gear Ratio," https://www.wikihow.com/Determine-Gear-Ratio, Oct. 16, 2019, 5 pages.

Wikipedia, "Strain wave gearing," https://en.wikipedia.org/wiki/Strain_wave_gearing, last edited on Dec. 10, 2019, 2 pages.

Harmonic Drive, "Speed Reducers for Precision Motion Control," 2018, 56 pages total.

Wikipedia, "Cycloidal drive," https://en.wikipedia.org/wiki/Cycloidal_drive, last edited on Feb. 10, 2020, 3 pages.

ATO, "Planetary Speed Reducer Working Principle and Applications," Jan. 2, 2020, 5 pages.

International Searching Authority, "Notification of Transmittal of the International Search Report and the Written Opinion of the International Searching Authority," mailed Jun. 23, 2020, in International application No. PCT/US2020/019032.

European Patent Office, Extended European Search Report mailed May 30, 2022 in European Patent Application No. 20759061.3 (10 pages).

European Patent Office, Communication Pursuant to Article 94(3) dated Jul. 20, 2023 in European Patent Application No. 20759061.3 (13 pages).

European Patent Office, Communication under Rule 71(3) EPC dated Feb. 4, 2025 in European Patent Application No. 20759061.3 (83 pages).

European Patent Office, Communication under Rule 71(3) EPC dated Jul. 18, 2025 in European Patent Application No. 20759061.3 (83 pages).

\* cited by examiner

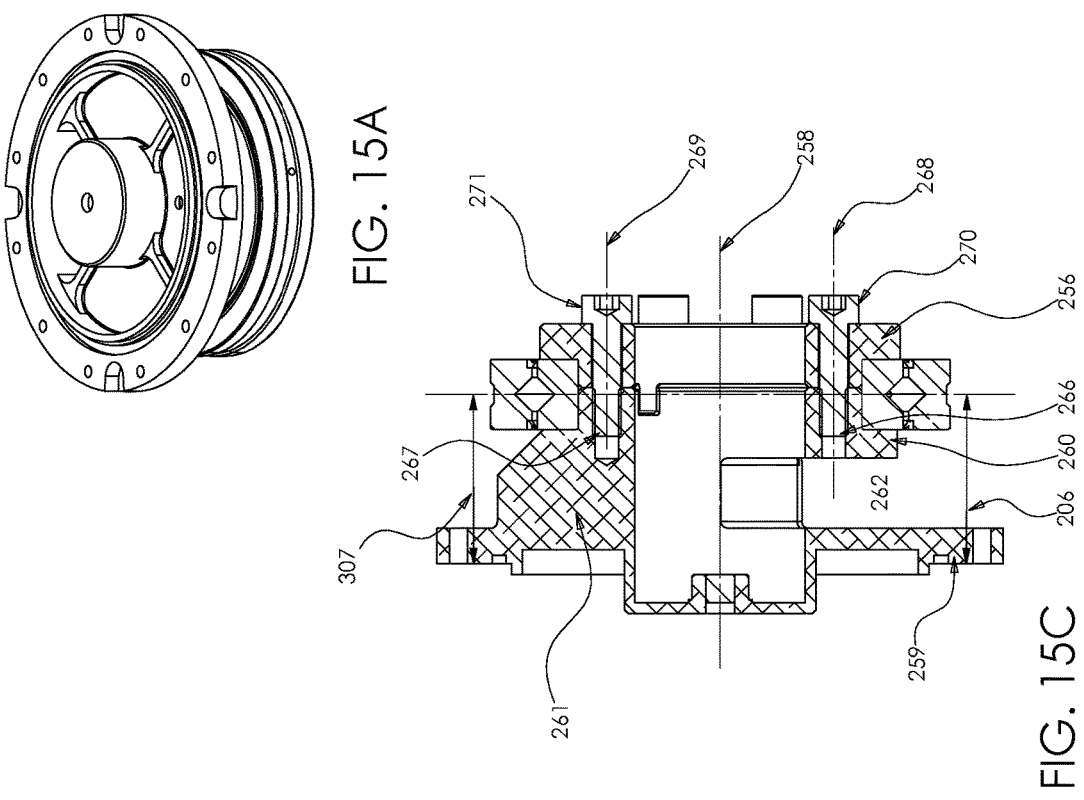
FIG. 15A
FIG. 15C
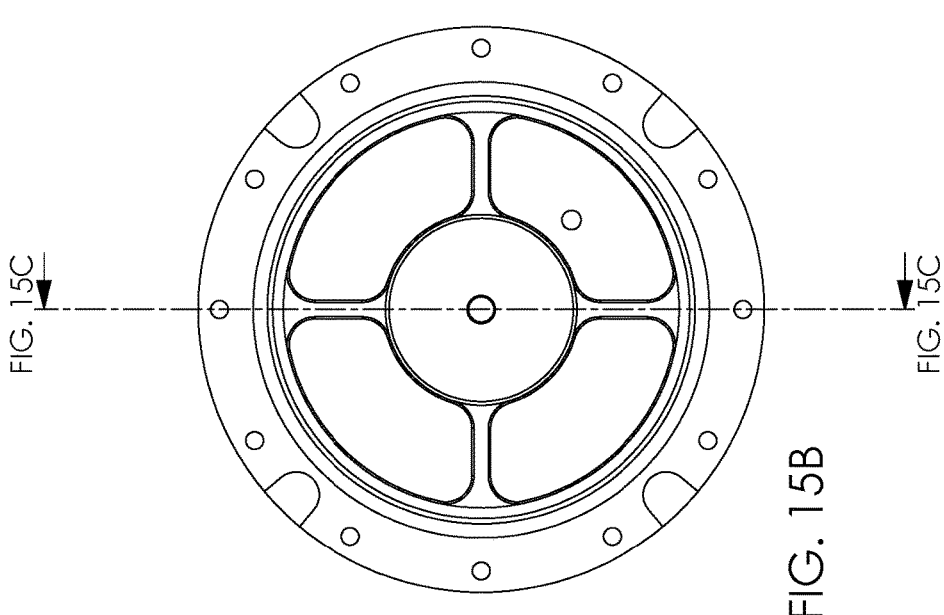
FIG. 15B

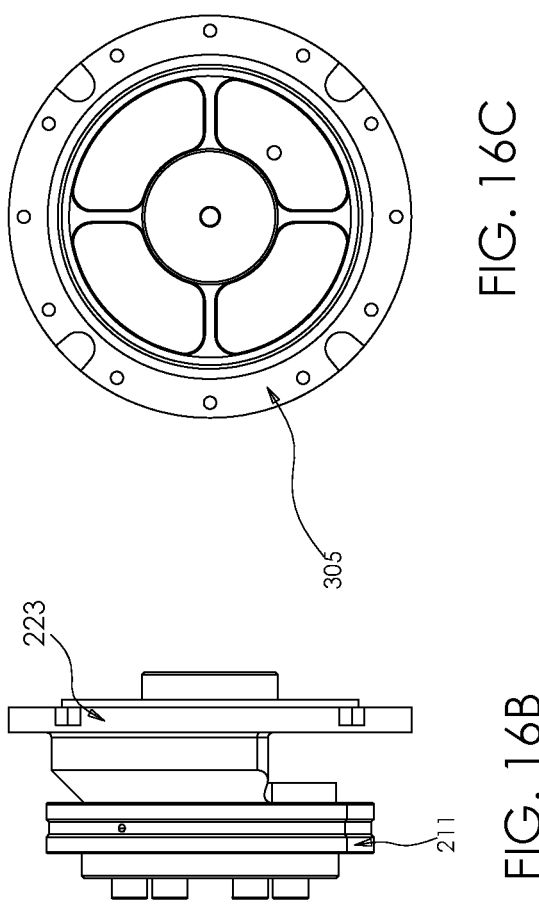
FIG. 16C
FIG. 16B
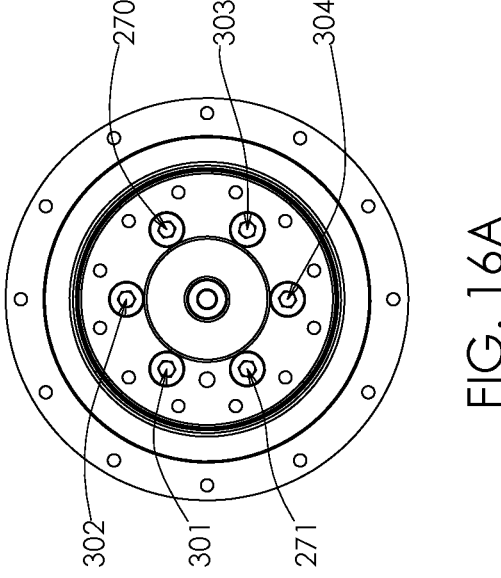
FIG. 16A

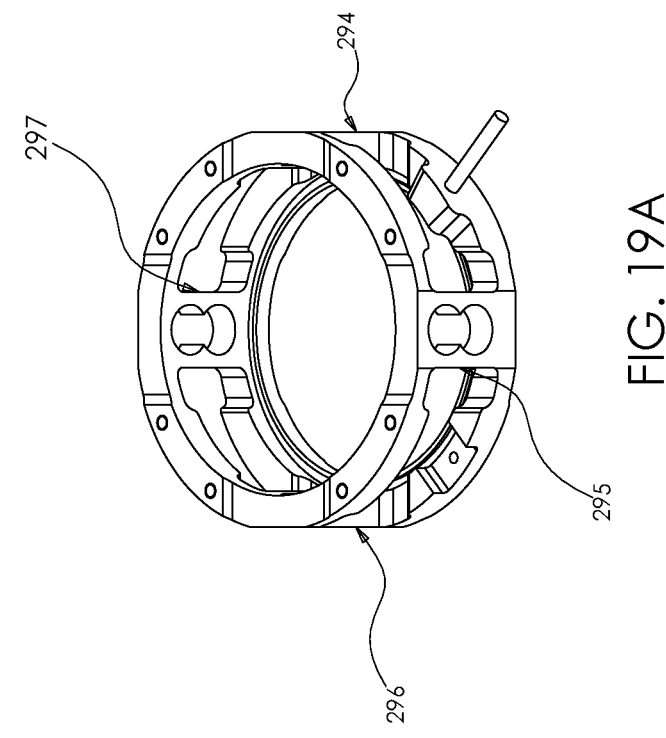
FIG. 19A
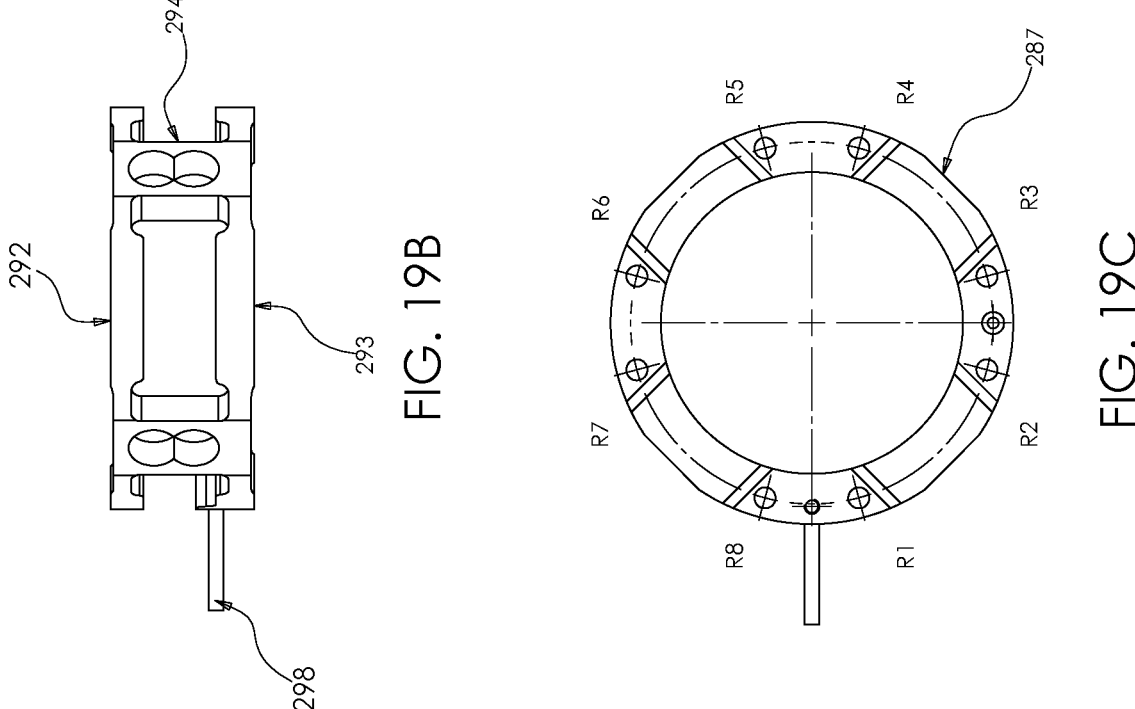
FIG. 19B
FIG. 19C

ACTUATOR FOR PHYSICAL THERAPY

CROSS-REFERENCE TO RELATED APPLICATION

This application is a continuation of U.S. patent application Ser. No. 17/502,144, filed Oct. 15, 2021, which is a continuation of U.S. patent application Ser. No. 16/796,240, filed Jul. 20, 2020 and entitled "Actuator for Physical Therapy", now U.S. Pat. No. 11,147,731, issued Oct. 19, 2021, which claims priority to U.S. Provisional Patent Application No. 62/808,116 filed on Feb. 20, 2019 and entitled "Torque Sensing Actuator for Assist-as-Needed Physical Therapy". The content of each of the above applications is hereby incorporated by reference.

TECHNICAL FIELD

Embodiments of the invention are in the field of physical therapy and, in particular, robotic therapy.

BACKGROUND

As addressed in U.S. Pat. No. 10,463,560, exoskeletons are mechatronic systems worn by a person in such a way that a direct transfer of mechanical power from the exoskeleton occurs. These robotic mechanisms have been applied in a variety of settings, for example, telemanipulation, man-amplification, rehabilitation, and to assist impaired human motor control. However, many of these applications of exoskeleton devices have yet to find widespread use, acceptance, or practicality.

One example area in which these devices have been proposed is the treatment of stroke. Stroke affects thousands of Americans every year and the recovery process is long, difficult, and costly. The use of a robotic exoskeleton may potentially reduce the length, difficulty, and cost of this recovery process. Various efforts have been proposed to provide a robotic exoskeleton for the upper-body.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 11A provides an assembly drawing (as well as a perspective view FIG. 11B)) of a sub-portion 1100 of the embodiment of FIG. 7 with a focus on wire routing internal to a rotary shaft (where the shaft has an inaccessible end comprising a motor). FIG. 11 also provides a perspective view (FIG. 11C) of a conduit that functions as a wire channel.

FIG. 15C provides a cross-sectional view (with FIGS. 15A and 15B providing perspective and top views of a sub-portion of the embodiment of FIG. 7 with a focus on a means for promoting dimensional accuracy for an asymmetrical rotary shaft in a stressed state.

FIGS. 16A, 16B and 16C collectively provide side, rear and front views of the embodiment of FIGS. 15A-C with a focus on a means for promoting dimensional accuracy for an asymmetrical rotary shaft in a stressed state.

FIGS. 19A, 19B and 19C collectively provide side, perspective, and top views of the compliant force sensing element of FIGS. 18A and 18B.

DETAILED DESCRIPTION

Figure 1:
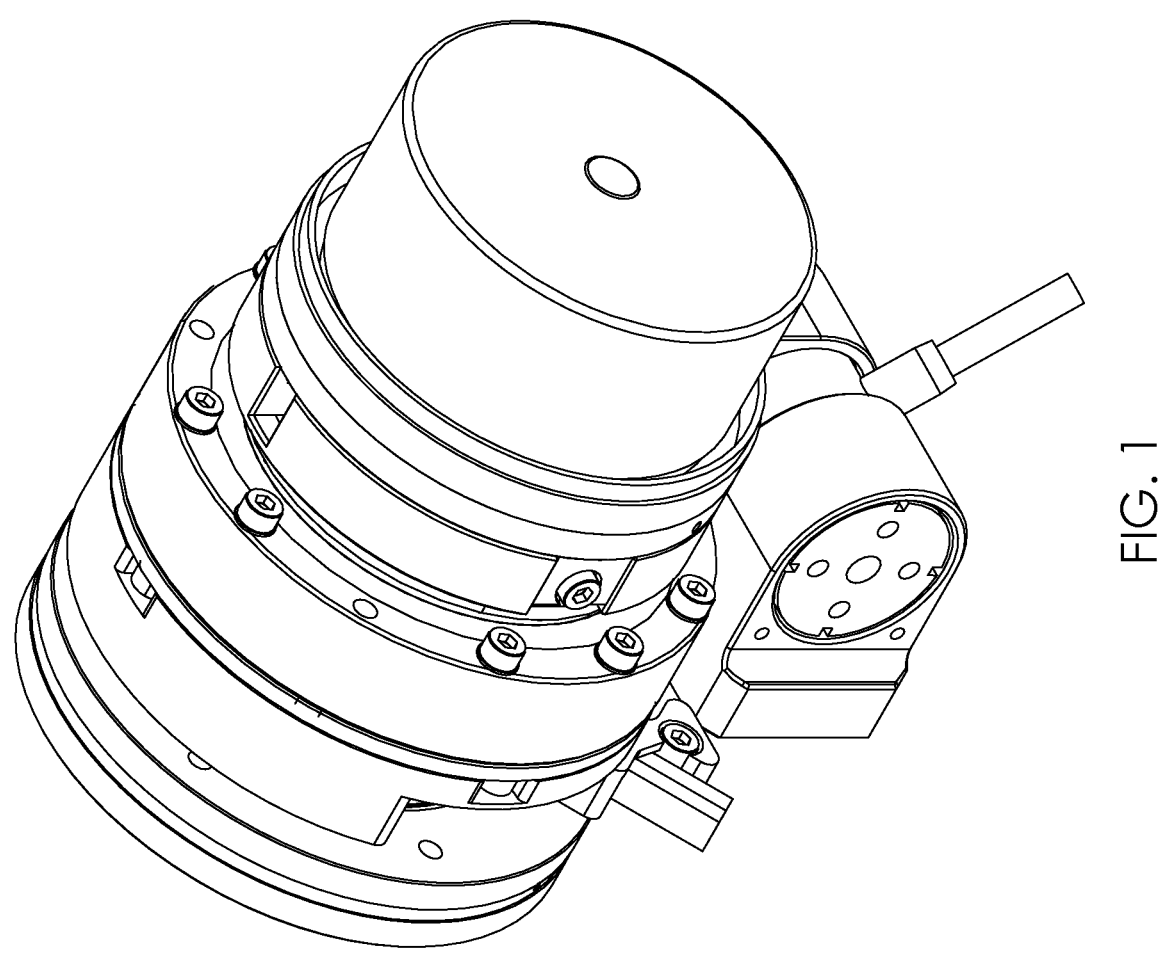
FIG. 1 provides a perspective view of an actuator in an embodiment.
Figure 2:
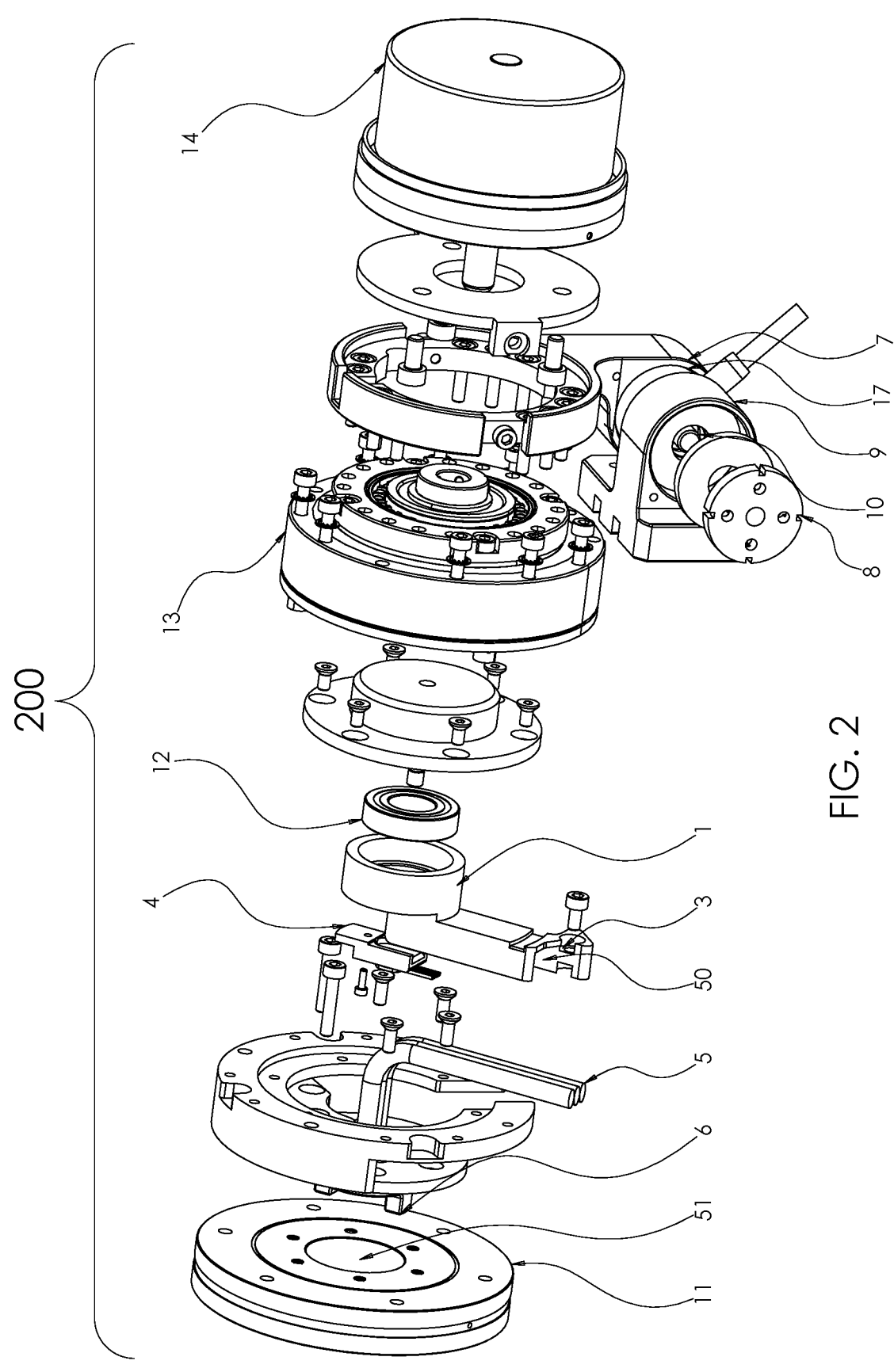
FIG. 2 provides an assembly drawing of an actuator in an embodiment.
Figure 3:
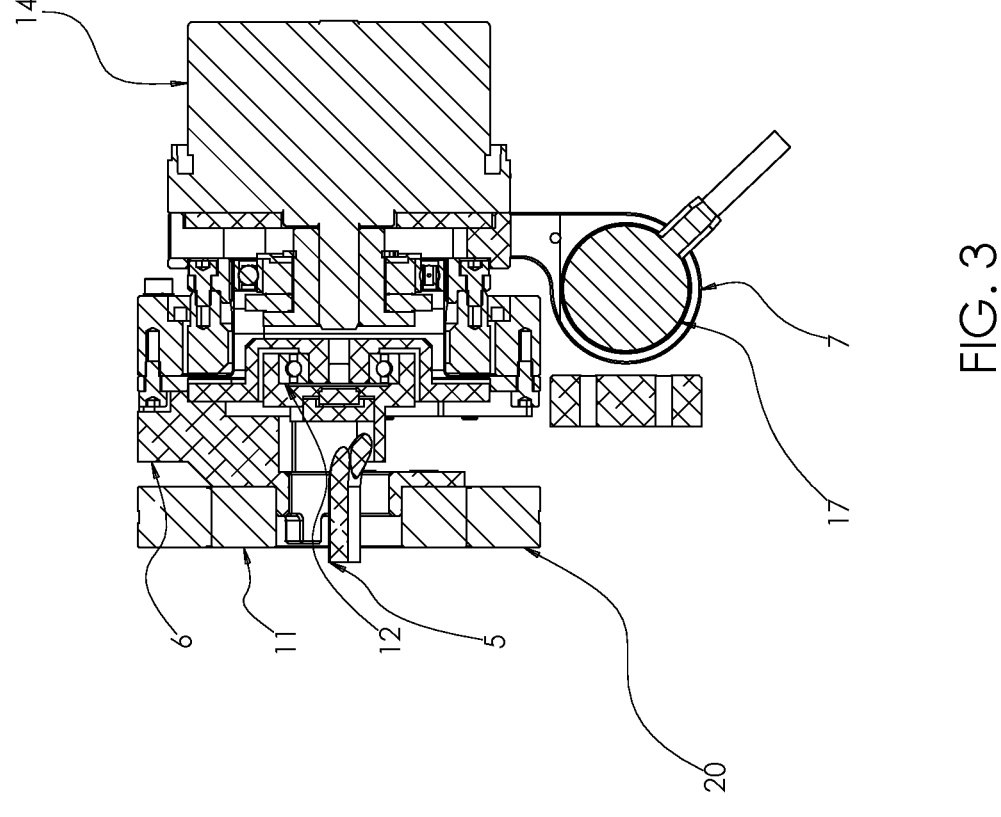
FIG. 3 provides a cross-section drawing of an actuator in an embodiment.
Figures 4A, 4B, 4C, 4D:
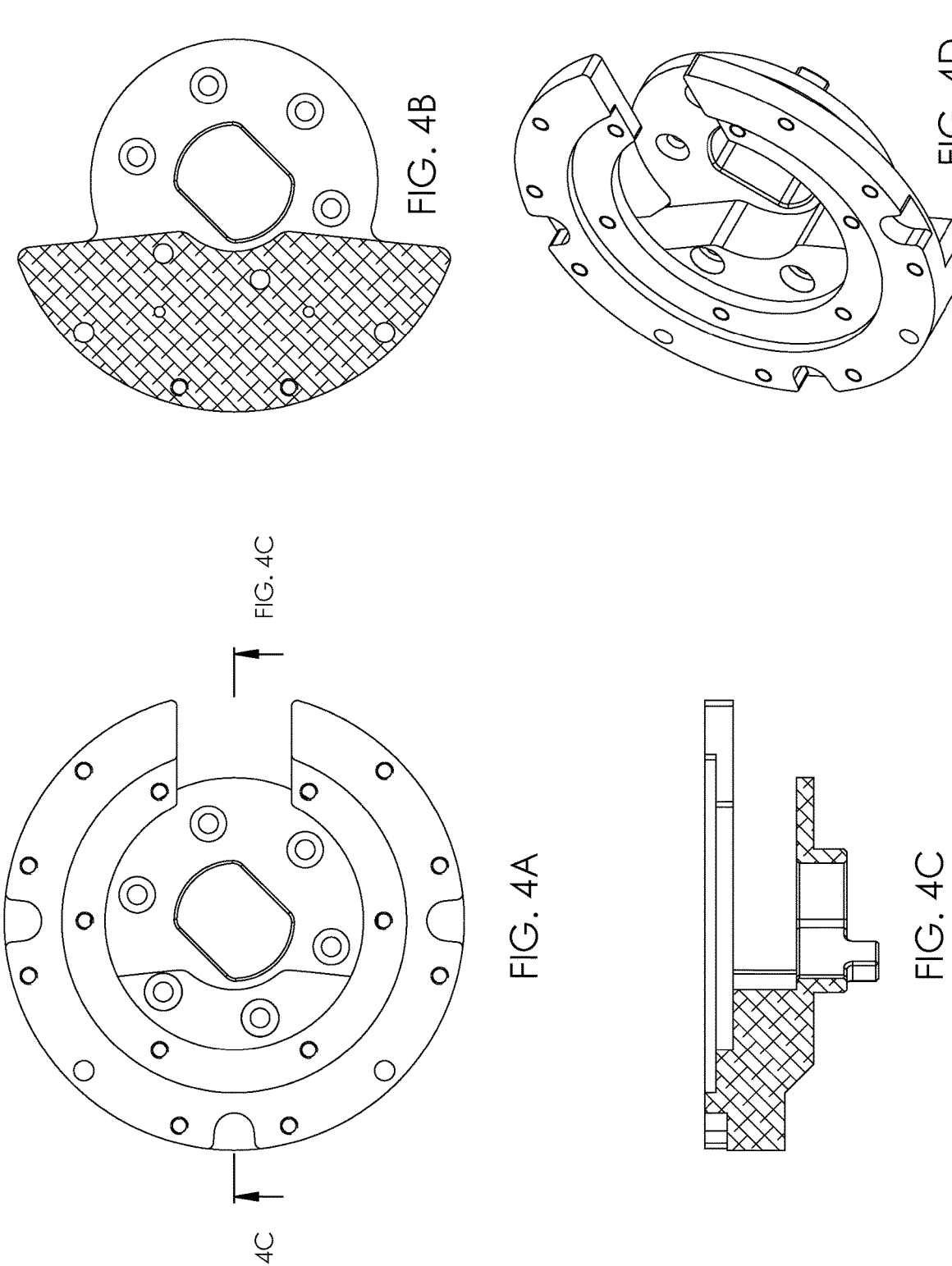
FIGS. 4A, 4B, 4C, 4D collectively provide a top view, a perspective view, a cross-sectional view, and another cross-sectional view of a coupler or conduit in an embodiment.
Figure 5:
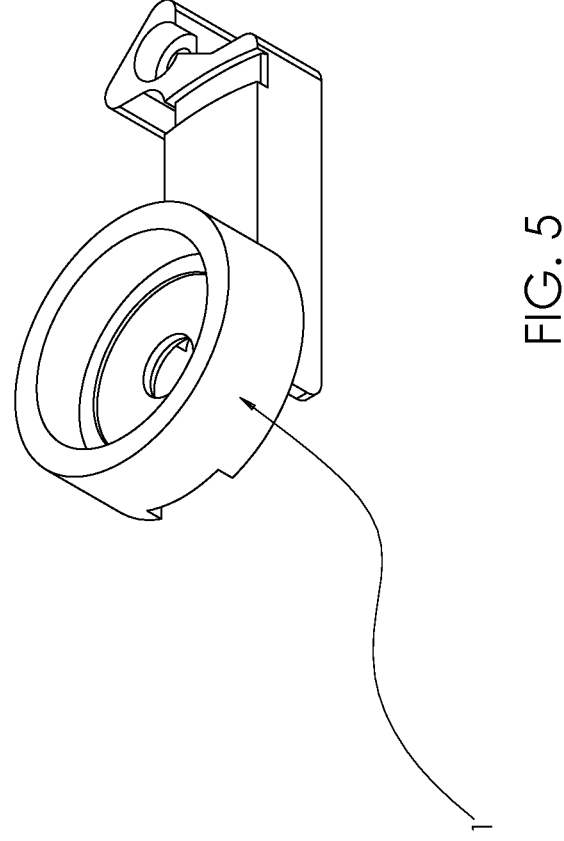
FIG. 5 provides a perspective view of a conduit for accepting a sensor and for conveying electrical wiring/cabling in an embodiment.
Figure 6A:
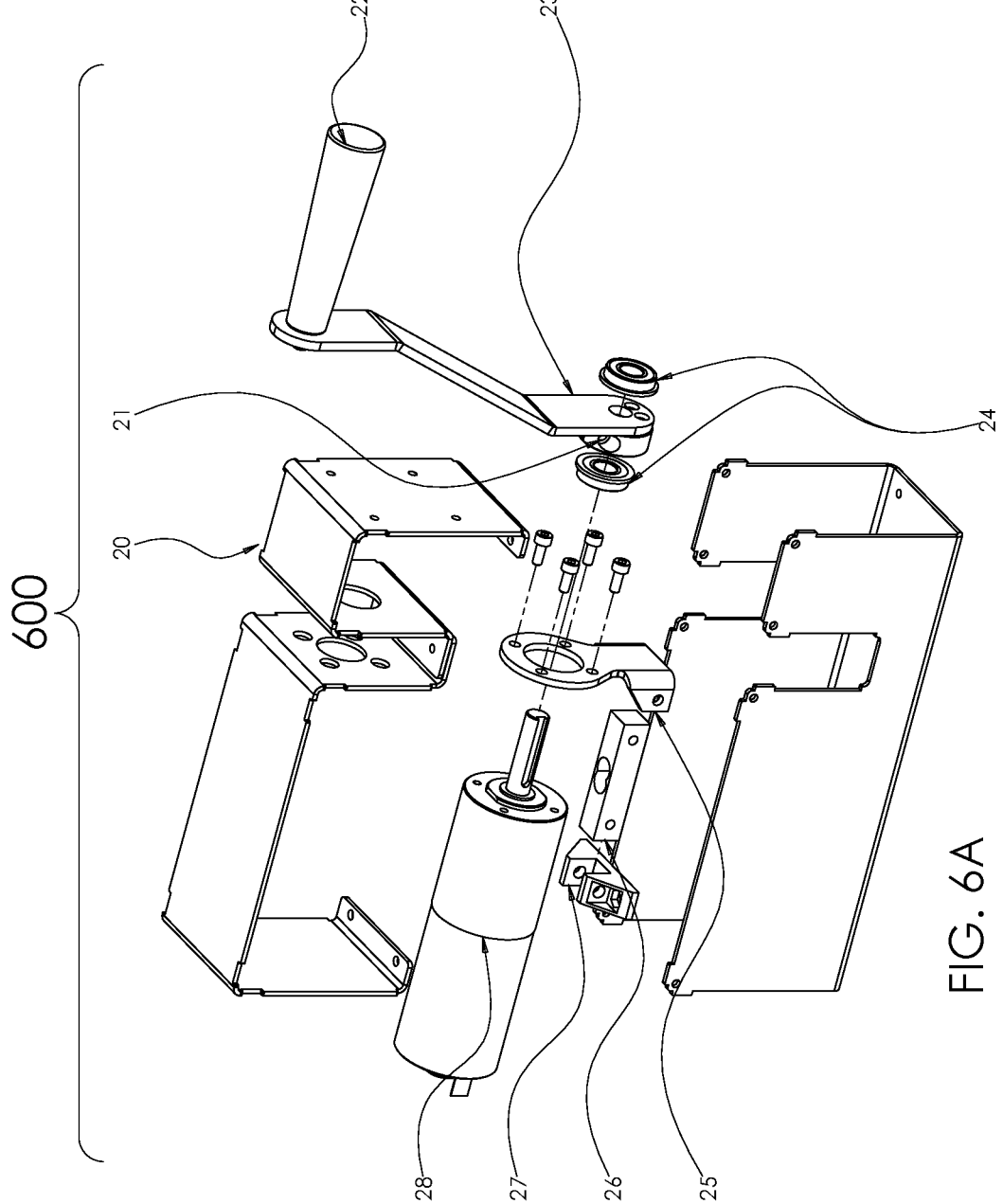
FIG. 6A provides an assembly drawing of an actuator assembly 600 in an embodiment.
Figure 6B:
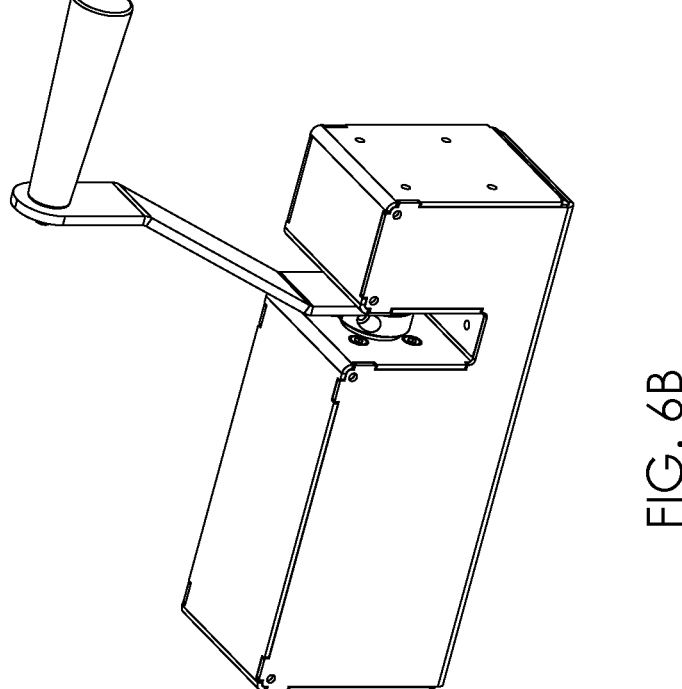
FIG. 6B provides a perspective view of the embodiment of FIG. 6A.
Figures 6C, 6D:
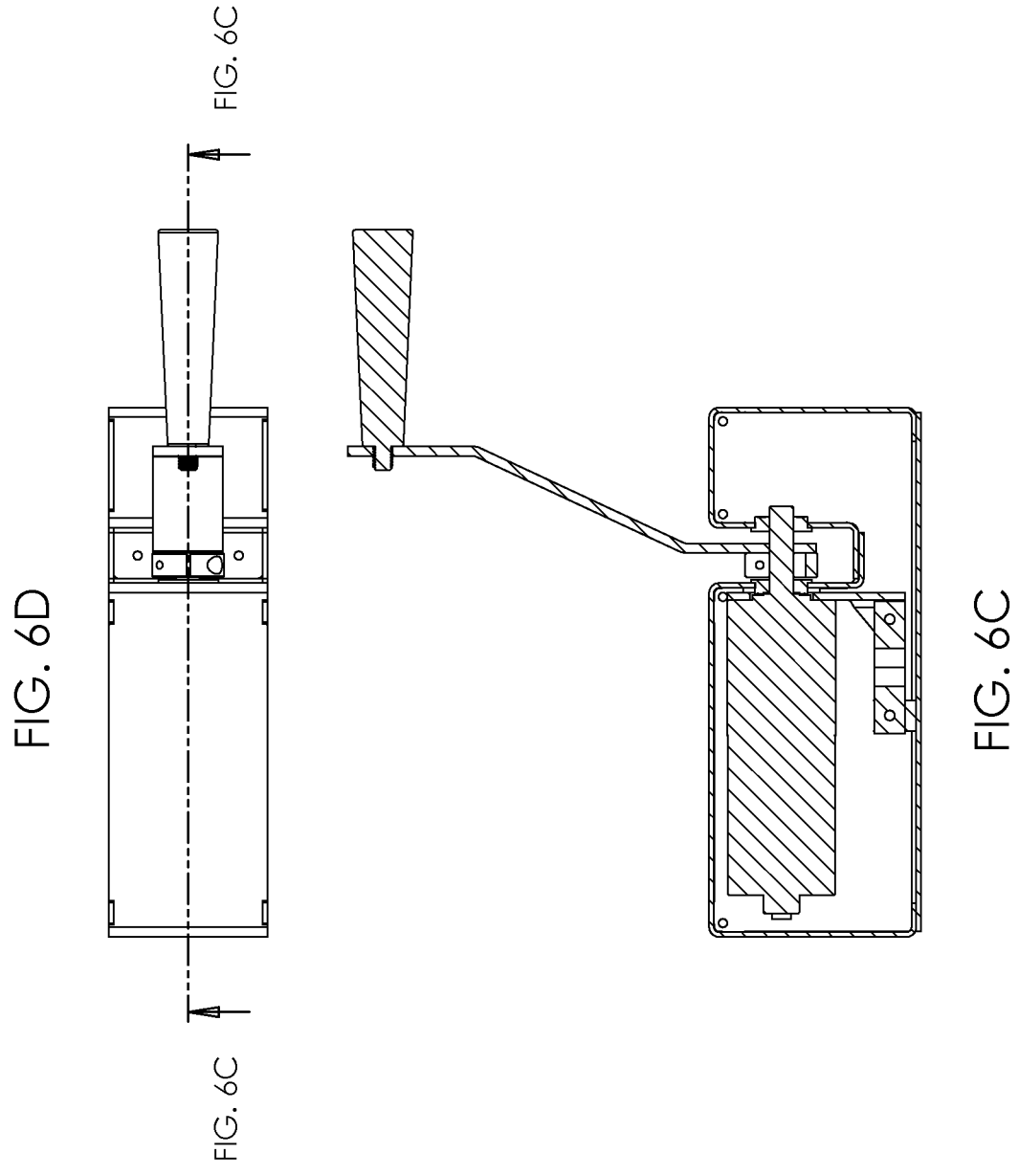
FIG. 6D provides a top view of the embodiment of FIG. 6A and FIG. 6C provides a cross-sectional view of the embodiment of FIG. 6A.
Figure 7:
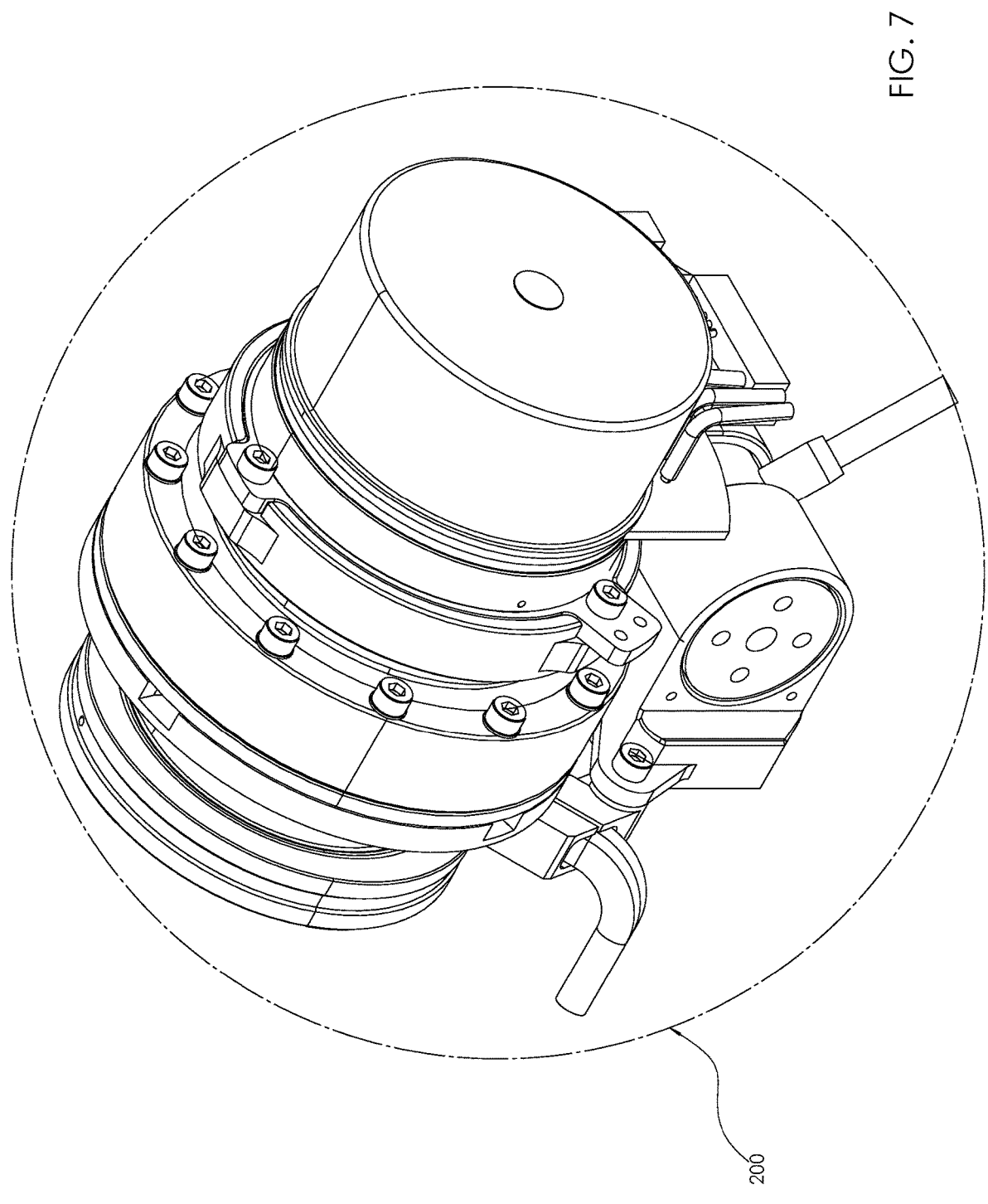
FIG. 7 provides a perspective view of an actuator in an embodiment.

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Applicant determined physical therapy for rehabilitation of neurological and neuromuscular disorders has many shortcomings in its current manual techniques. Robotic therapy devices have potential to provide beneficial improvements, but are limited by the algorithms that they can use to provide effective therapy. Many useful algorithms also require additional sensing capabilities on the actuator of the robotic device. Embodiments described herein address these problems.

An embodiment includes a torque sensing actuator for assist-as-needed physical therapy. The embodiment addresses the design of a more appropriate class of actuator technology than existing research methods to deliver the required algorithms for rehabilitation therapy An embodiment addresses a device and method for robotic rehabilitation therapy focused at individualized patient care, and potentially enabling the use of rehabilitation devices in patient homes. An embodiment addresses algorithms and/or methods implemented via code for use in robotic rehabilitation therapy. An embodiment addresses smart actuators capable of active torque measurement, which is an integral part of the algorithms used in robotic physical therapy.

An embodiment improves upon manual physical therapy (which is the current standard administered to most patients in the clinical setting). An embodiment allows active sensing and customization to the individual patient's progress and also allows for assessment of the patient's recovery over time.

An embodiment addresses torque sensing actuators, where a robotic actuator interacts with other objects. In such a situation it is often useful for the robotic actuator to know how much force the robotic actuator is imparting on an object. Typical robotic actuators only consider the position of the actuator and can thus inadvertently exert large forces on an object when the actuator moves. Torque sensing actuators allow the actuator to consider the force of the interaction in addition to the position and thus prevent accidents when the actuator move. In addition, the torque sensor can provide feedback to the operator and allow for additional data to be collected.

Applicant determined existing devices in the field lack the appropriate actuator design to be robust and effective in the clinical and home rehabilitation setting and use the algorithms required for effective neurological or neuromuscular rehabilitation.

As mentioned above, applicant determined physical therapy for rehabilitation of neurological and neuromuscular disorders has many shortcomings in its current manual techniques. Robotic therapy devices have potential to provide beneficial improvements, but are limited by the algorithms that they can use to provide effective therapy. Many useful algorithms also require additional sensing capabilities on the actuator of the robotic device.

Other devices in the market are largely passive systems working on fixed resistances set by the physical therapist. There do exist a few research-based robotic devices that employ assistive algorithms, but they use a different class of actuators for the purpose which possibly makes them unsuited to clinical rehab settings.

In contrast, an embodiment addresses a design of a more appropriate class of actuator technology than existing research methods to deliver the required algorithms for rehabilitation therapy.

Embodiments are addressed in FIGS. 1-6D. Encoder housing 1 holds the active 15 and passive 16 element of an absolute angle sensing pair. Encoder alignment bearing 12 ensures alignment between the absolute angle sensor's subcomponents for accurate readings. Encoder element 16 is the passive sub-component of absolute encoder 15, which is used for angle measurement. Encoder mount 3 is a dualpurpose component that provides a protected channel 50 to route wiring 5 from the external stator side into the hollow bore 51 of the actuator. Mount 3 also provides a reference datum on which absolute angle measurement can be mounted. Encoder locking plate 4 provides an enclosure to mount the absolute angle sensor to element 3, which affixes to a housing.

Rigid output coupler 6 provides mechanical rigidity to allow the transfer of torque through the output (e.g., actuator arm that couples to bearing 11) while enabling mount 3 to be positioned in place.

Stator mount 7 enables a single load path for the actuator force that can be measured through inline load sensors. Torque sensor spring mount 8 provides a mechanical load path, torque sensor mounting bracket 9 provides a mechanical load path, and torque sensor mounting flange 10 (for torque sensor 17) provides a mechanical load path. Element 11 is a main bearing.

In the embodiment of FIGS. 6A-6D, housing 20 provides a base structure to support and ground the system. Output collar 21 secures the output shaft to the shaft of the geared motor or alternatively secures a gear or belt drive for continuous operation. Output arm 22 is a linkage to human contact point.

Output handle 23 provides a physical human robot interaction interface. Main bearings 24 support the output shaft and stator mount 25 enables a single load path for the actuator force that can be measured through inline load sensors. Load sensor 26 is a sensing element. Torque sensor mounting bracket 27 is a mechanical load path. Element 28 is a motor-gearbox-encoder unit for mechanical actuation.

Returning to FIGS. 1-5, rigid output coupler 6 enables the transfer of torque through the actuator without requiring the motor 14, speed reducer 13, or encoders to be hollow shaft. Component 3 provides protection and routing for wiring 5 as well as a rotationally fixed mount for an absolute encoder 15.

Component 7 enables the passage of the entire load through a single axial path and enables the use of inline stress measurement sensor 17 to capture torque values.

Similarly, in the variant shown in FIGS. 6A-6D, the stator mount 25 allows for a single load path for the entire reaction force to the applied torque, which can then be channeled through a beam bending load cell 26 to capture torque values.

In an embodiment the actuator functions by lateral access to a hollow-bore output shaft (e.g., see element 51) of the actuator, thus enabling the use of compact motors and speed reducers while still gaining the benefit of wire channeling through a hollow output shaft. The rigid output coupler 6 enables a completely rigid and constrained assembly while still offering lateral access over more than 180 degrees for the encoder mount and wire guider 3 to gain access. This also enables a stationary datum for the placement of an inline absolute angle measurement. A single point off-axis position for load measurement 7 provides a single load path for torque measurement.

In the assist-as-needed paradigm for physical therapy, an accurate sensing of the applied load is critical. An embodiment of an actuator provides the sensing and actuation required for closed loop torque control. A therapy algorithm and the load measurement sensor detect the movement of a user and assist his/her movement. The algorithm generates a force field to regulate the movement of a user to a desired trajectory of movement. The force field is determined with a spatial information of a user's body.

In essence, an embodiment addresses the use of joint-level torque sensing capabilities in the embodiments suggested herein for applications involving physical Human Robot Interaction, including but not limited to physical therapy applications. While exoskeletons and the like are addressed actuator embodiments addressed herein may be useful for any number of robotic manipulators in and out of the healthcare space. The technology may be useful in industrial applications where process errors may be identified by the force sensor detecting forces that are not expected by the robot, and tracking the force exerted during typical processes to ensure process reliability.

To make an embodiment, the components are assembled with the motor and speed reducer mounted as a single unit. The output of the speed reducer is connected to the output coupler 6 after the required wiring and angle sensing have been placed using the encoder mount 3. An alignment bearing 12 may be used for improved accuracy. For torque measurement, the stator of the speed reducer is connected through a single off axis point to a load measurement sensor 7.

An embodiment can be used for actuation as a component of robotic systems which physically interact with humans, primarily but not limited to physical therapy applications. The assist as needed paradigms enabled by the torque sensing actuator are designed as tools for rehabilitation of neuromuscular disorders.

An embodiment can be used as an actuator in any situation where cable routing, angle sensing and torque measurement, or any combination of the three, is required. Embodiments can be used in the field of robotics for physical human robot interaction, but are also applicable to other forms of actuation.

Embodiment of FIGS. 7-16C are now described.

Figure 8:
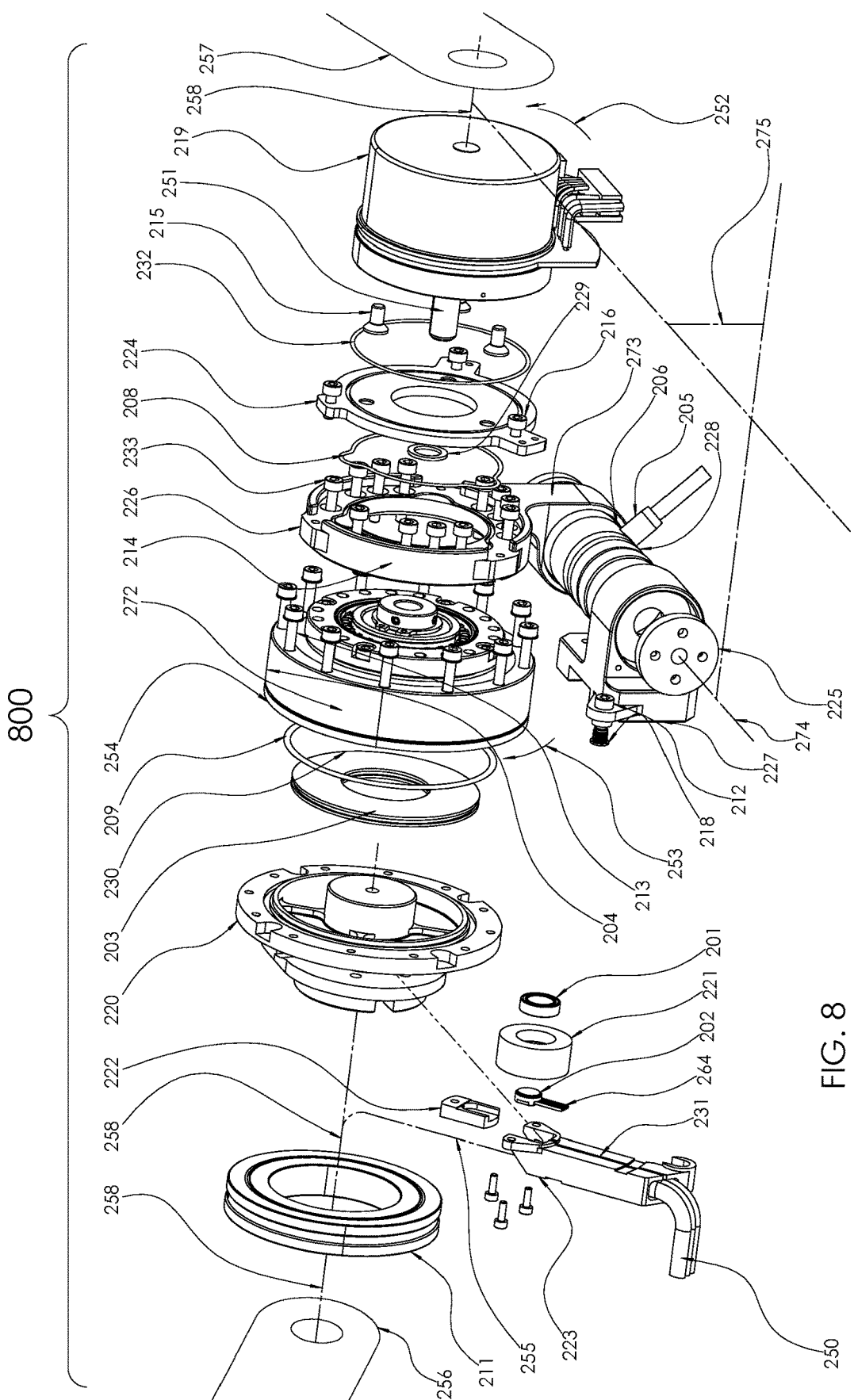
FIG. 8 provides a provides an assembly drawing of assembly 800 of the embodiment of FIG. 7.
Figure 9B:
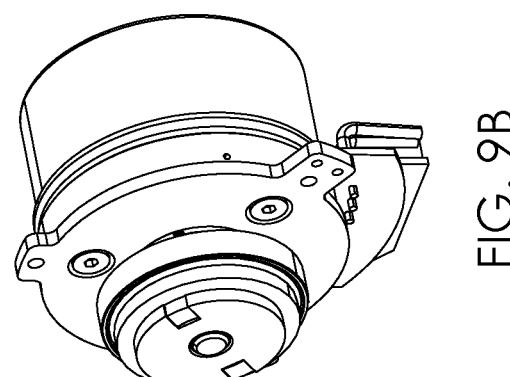
FIG. 9A provides an assembly drawing (as well as perspective (FIG. 9B) and side views FIG. 9C)) of a sub-portion 900 of the embodiment of FIG. 7 with focus on a motor and gear drive.
Figure 9C:
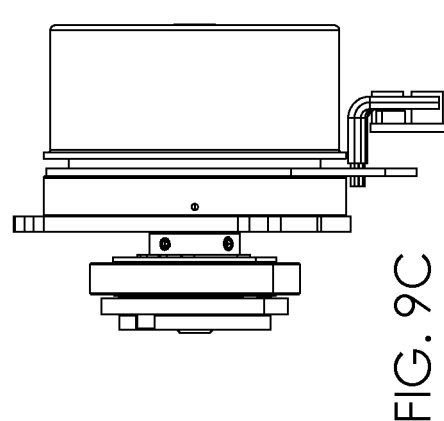
Figure 9A:
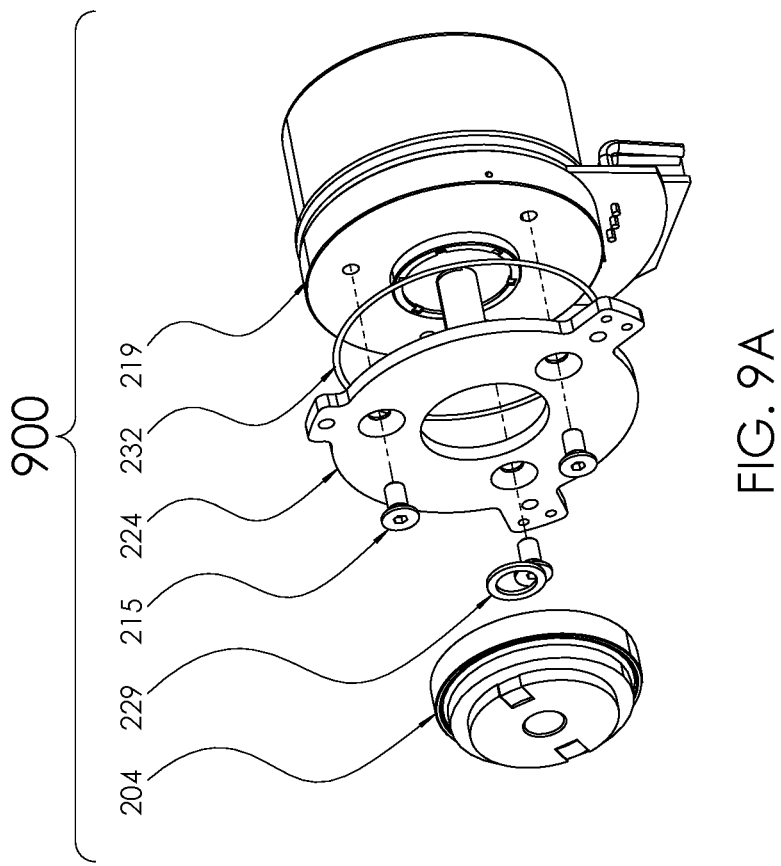
Figure 10B:
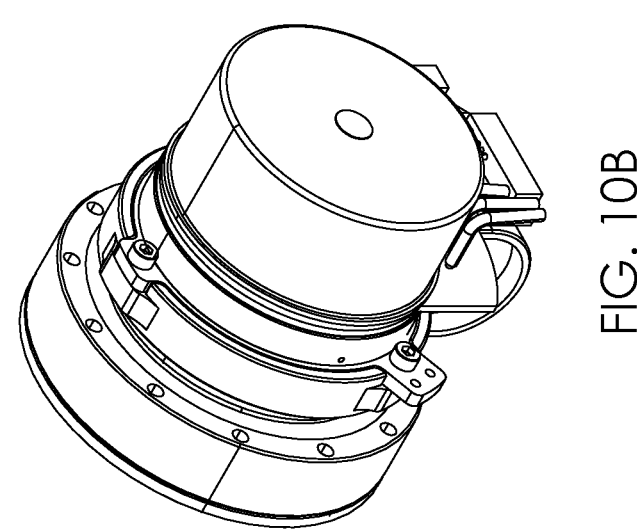
FIG. 10A provides an assembly drawing (as well as a perspective view FIG. 10B)) of a sub-portion 1000 of the embodiment of FIG. 7 with a focus on a linear force sensor that measures output torque of the actuator.
Figure 10A:
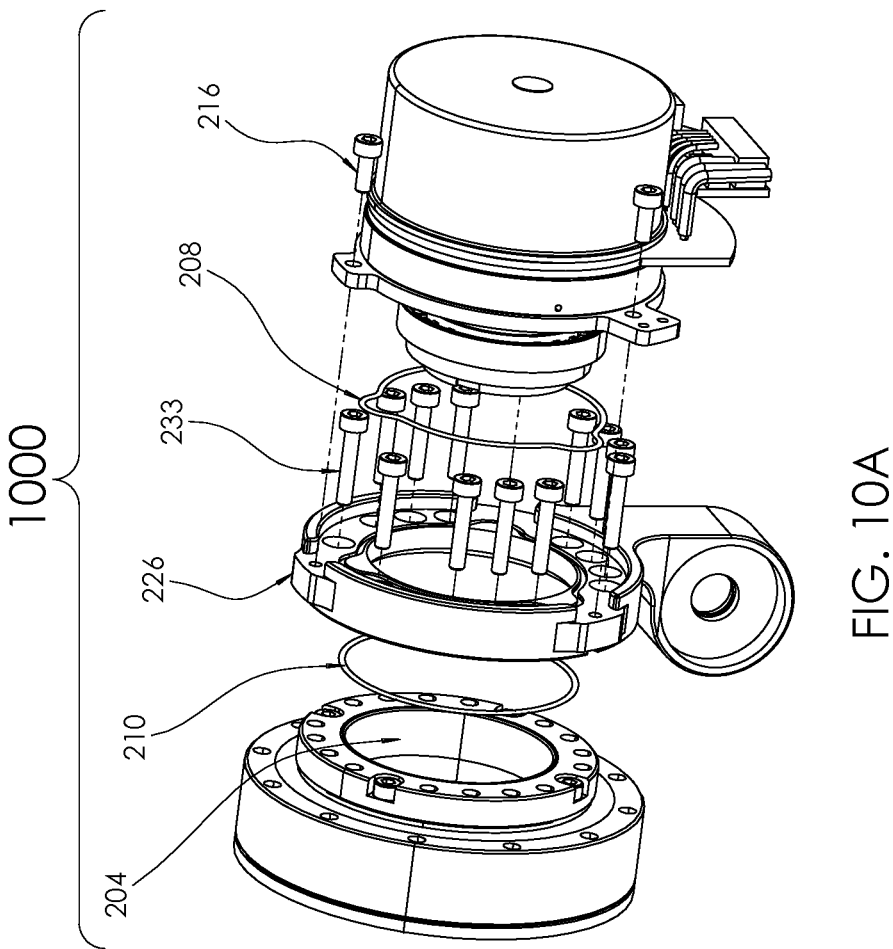

FIG. 8 illustrates an exoskeleton system comprising an artificial joint coupling two artificial linkages 256, 257. For example, the linkages may be a forearm and an upper arm coupled by joint 200, such as an artificial elbow. The joint may include at least one cable 250. Such a cable may comprise other cables/cords/wires/interconnects/traces that communicate data, transmit energy, enable sensing, and the like. The joint includes a motor 219 having a shaft 251, a strain wave gear 204 having a flexible member 254, a conduit 220, and a bearing 211. The strain wave gear is between the motor and the conduit and the conduit is between the strain wave gear and the bearing. The motor is configured to rotate the shaft in a first direction 252 and the strain wave gear is configured to rotate the flexible member in a second direction 253 that is opposite the first direction. The conduit 220 is configured to rotate in the second direction in response to rotation of the flexible member in the second direction. For example, the conduit may be coupled to the flexible member 254 via anchors 213, such as bolts or screws or staples. The at least one cable 250 passes through (see path 255) both the bearing and into the additional linkage 256 but does not pass through either of the strain wave gear or the motor.

Figures 11A, 11B, 11C:
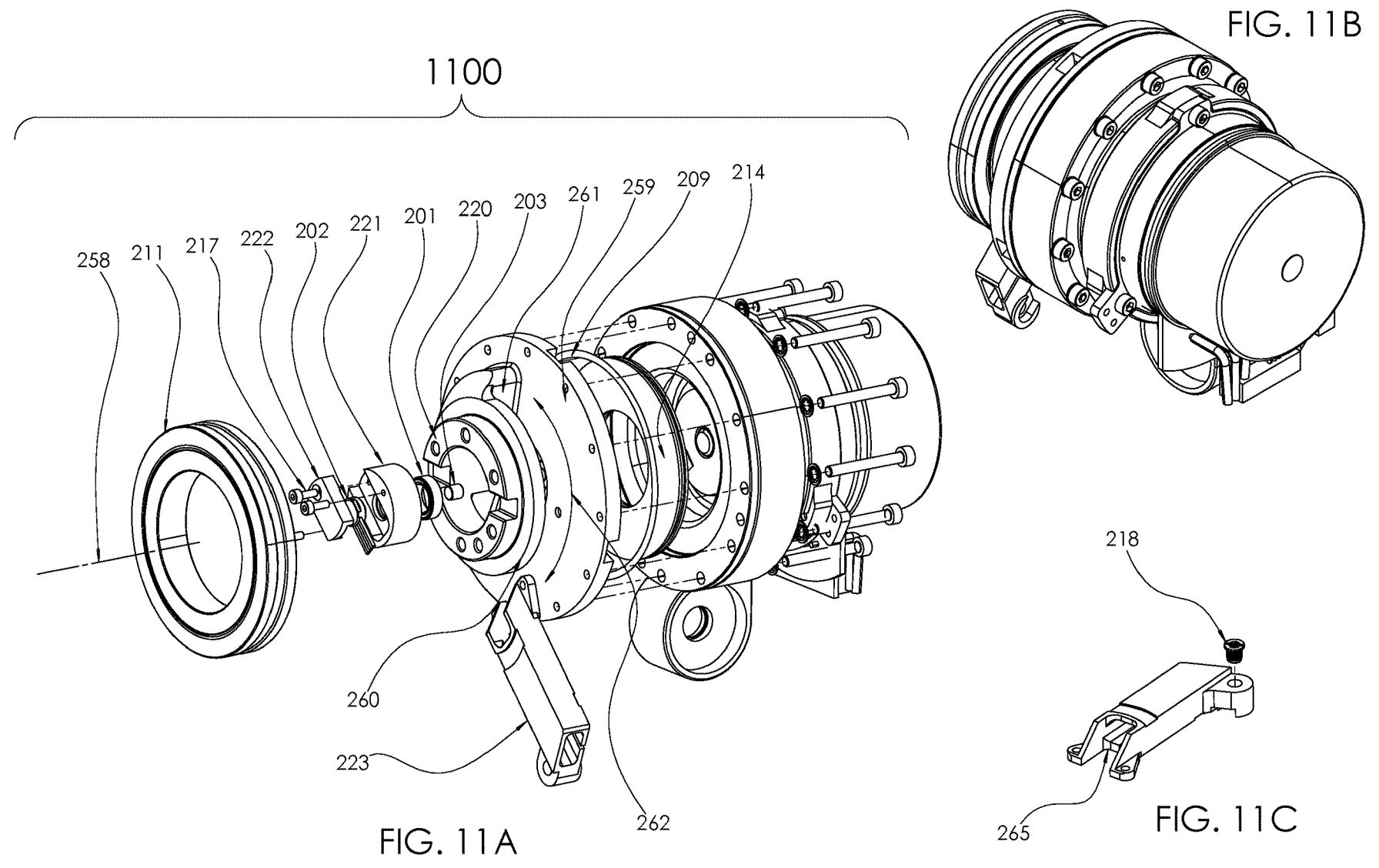

The conduit 220 (sometimes referred to herein as an "output coupler") is configured to rotate about longitudinal axis 258. As seen in FIG. 11A, the conduit comprises a first outer wall 259 with a perimeter that extends at least 270 degrees about the axis. Another view of conduit 220 is found in FIG. 13B, where the perimeter extends 360 degrees. Conduit 220 also includes a second outer wall 260 with a perimeter that extends at least 270 degrees about the axis. In FIG. 11A the perimeter of the second outer wall extends 360 degrees. Conduit 220 includes an inner wall 261 with a perimeter that extends less than 180 degrees about the axis. For example, in FIG. 13B a cross-section shows the wall extends just under 180 degrees. Wall 261 couples the first and second outer walls 259, 260 to each other. The first and second outer walls and the inner wall collectively define a channel 262 that extends more than 180 degrees about the axis. As a result, conduit 220 may rotate along with flex member 254 without causing the cable 250 to rotate due to the running of the cable 250 within channel 262. A plane 263, which is orthogonal to the longitudinal axis 258, intersects the inner wall and the channel but not the first outer wall and not the second outer wall. For example, in an embodiment the at least one cable 250: (a) passes through the channel 262; (b) passes away from bearing 211, around outer wall 259, and towards motor 219; and (c) does not pass through outer wall 259.

In an embodiment, cable 250 is mounted in a static orientation. This may be due to, for example, running cable 250 through conduit 223 (sometimes referred to as a "wire channel"). Conduit 223 may affix to housing via an anchor 218 (see FIG. 11C). The channel 262 is configured to rotate with the conduit 220 about the axis in response to rotation of the flexible member 254 in the second direction.

In an embodiment the assembly 200 includes an angle sensor 202 configured to sense rotation of the conduit 220 about the axis in response to rotation of the flexible member in the second direction. In an embodiment, an additional plane, which is orthogonal to the axis, intersects the angle sensor 202 and the conduit. For example, some portion of sensor 202 may be within conduit 220 such that the additional plane intersects the sensor 202 and any of walls 259, 260, 261.

In an embodiment the angle sensor is an absolute rotary encoder. A rotary encoder collects data and provides feedback based on the rotation of an object (e.g., a rotating device such as conduit 220). Rotary Encoders are sometimes called "Shaft Encoders". This encoder type can convert an object's angular position or motion based on the rotation of the shaft, depending on the measurement type used. Absolute rotary encoders can measure "angular" positions while incremental rotary encoders can measure things such as distance, speed, and position. Embodiments are not limited to use with any one type of encoder such as magnetic, optical, magnetoresistive, Hall effect, inductive, capacitive, or laser-based encoders, rotary or linear encoders, absolute or incremental encoders.

An embodiment includes an additional at least one cable 264 that: (a) is coupled to the angle sensor and is included in channel 262; (b) passes away from the bearing, around outer wall 259, and towards the motor; and (c) does not pass through the outer wall.

Cables 250, 264 may pass through gap 231 and into conduit 223 for passage towards motor 219. As mentioned above, conduit 223 may be statically mounted to a housing of the linkage via anchor 218. As a result, conduit 223 is configured to remain statically mounted to the housing and not rotate with conduit 223 about axis 258 in response to rotation of flexible member 254 in second direction 253. In an embodiment conduit 223 is monolithic with a compartment 265 that includes at least a portion of the angle sensor.

Thus, as shown above, the overall assembly 200 is a torque sensing rotational actuator for robotic applications. One advantage of the system includes wire routing internal to a rotary shaft (e.g., where the rotary shaft includes bearing 211, wall 260, flex spine 254) with an inaccessible end (motor 219). Actuator 200 comprises force sensor 202, wire channel 223, and bearing 211 which are integrated with a gearmotor 204 to form an actuator assembly capable of measuring the rotational force output (see discussion below regarding force sensor 205) by the actuator assembly and allow a wire channel to pass through apertures such as the aperture of bearing 211. In other words, such a design provides a method for passing a wire 250 through the center of a shaft (e.g., a shaft that includes bearing 211, drive 204, motor 219) when one end of the shaft (the end with motor 219) is inaccessible. This happens by passing the wire through a slot 262 along the circumference of conduit 220 to the center of the same. This allows a gearmotor to be attached to an output shaft and a wire passed through the shaft's axis. The shaft (i.e., conduit 220) that connects the output rotation of the gearmotor has a hole through the shaft axis which meets a slot along the circumference of the shaft. The slot spans an arc (see arc of channel 262) wider than the desired output range of motion of the gearmotor. Into the circumferential slot a guide 223 is inserted that is fixed at one end via anchor 218 to a nonrotating part of the gearmotor and that extends to the hole through the axis. Wires 250 and/or 264 are routed through the guide, which prevents contact between the wires and the rotational shaft, and exit (e.g., wire 250) through the hole of bearing 211 through the shaft axis.

Figures 12A, 12B:
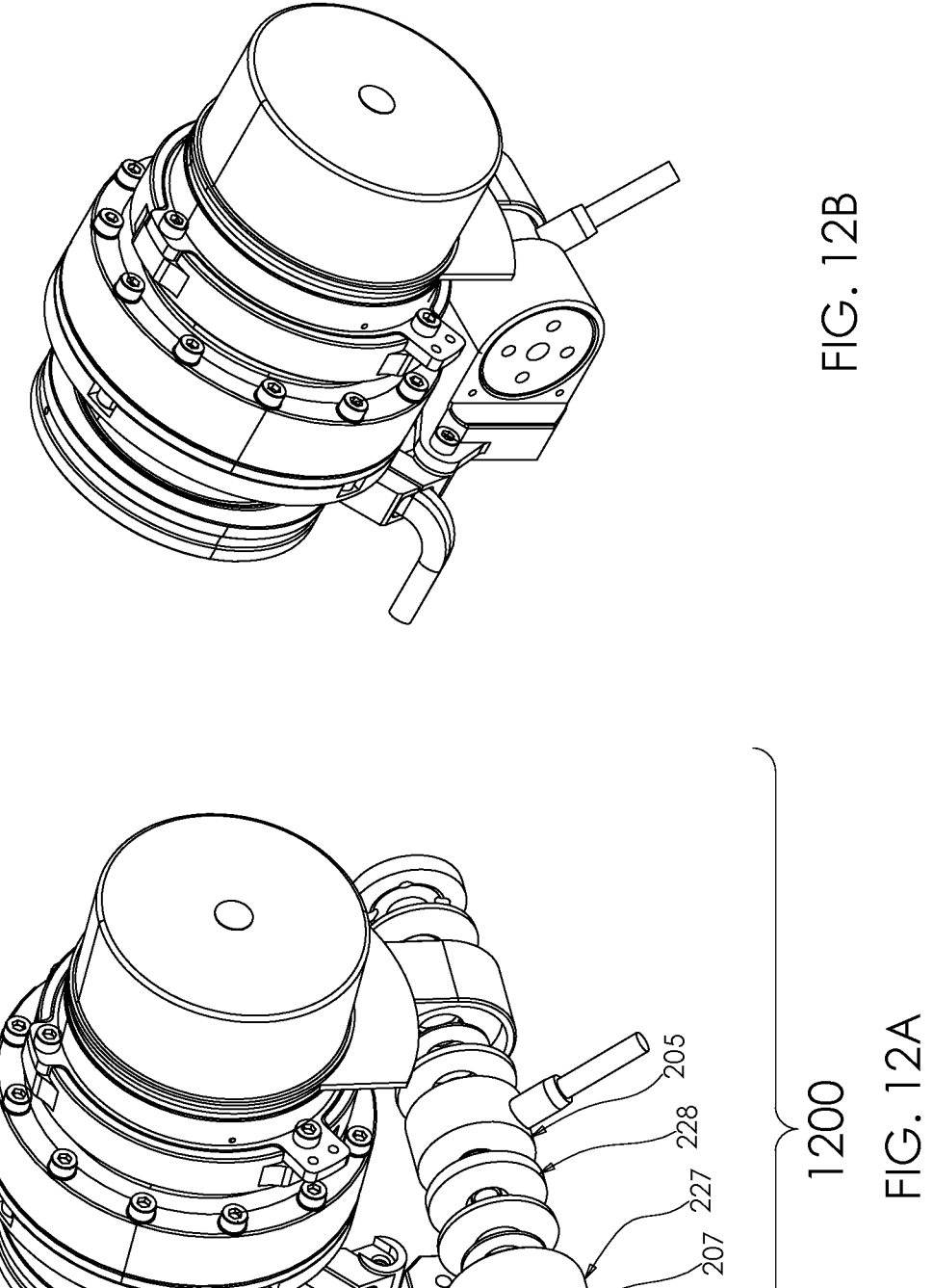
FIG. 12A provides an assembly drawing (as well as a perspective view (FIG. 12B)) of a sub-portion 1200 of the embodiment of FIG. 7 with a focus on a compliant bending joint created using a linear spring stack.
Figures 12C, 12D:
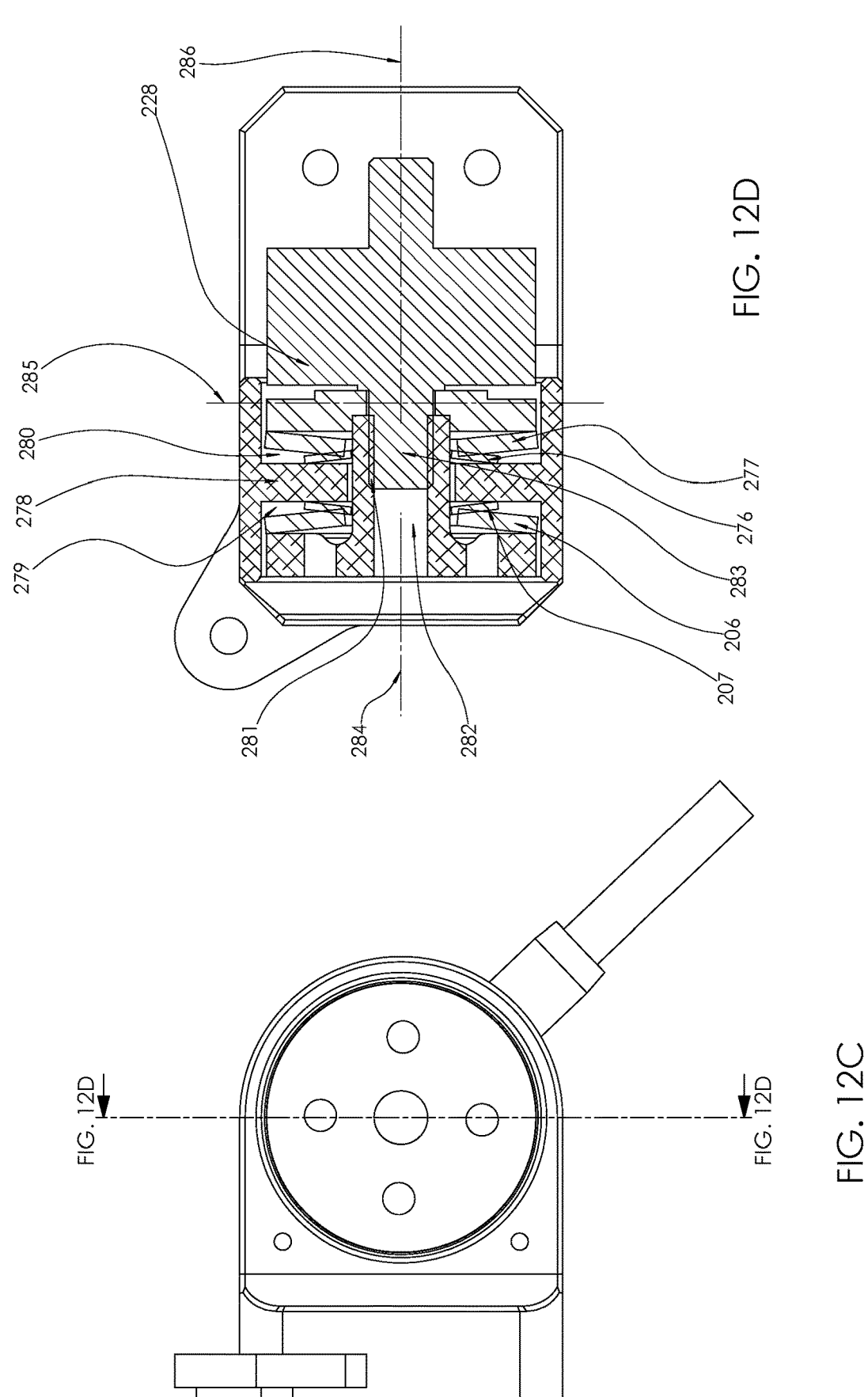
FIGS. 12C and 12D provide side and cross-sectional views of a subcomponent of the embodiment of FIG. 12A.
Figure 13C:
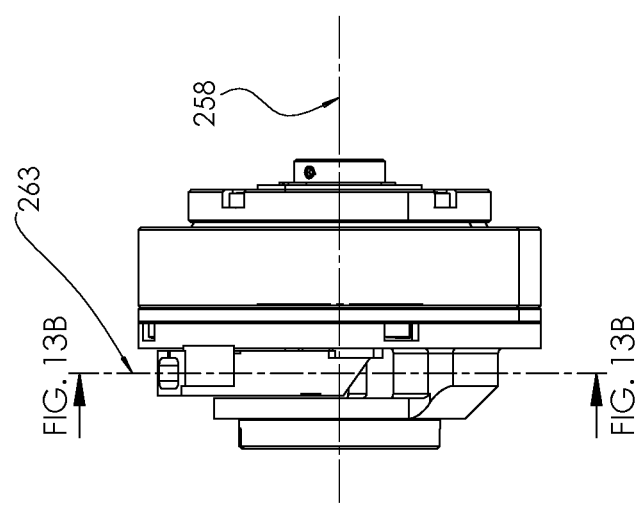
FIG. 13C provides a side view of the embodiment of FIG. 7 and FIGS. 13A and 13B provide two cross-sectional views of a sub-portion of the embodiment of FIG. 7 with a focus on a conduit having a channel (and another conduit within the channel) that promotes wire routing internal to a rotary shaft (where the shaft has an inaccessible end comprising a motor).
Figure 13B:
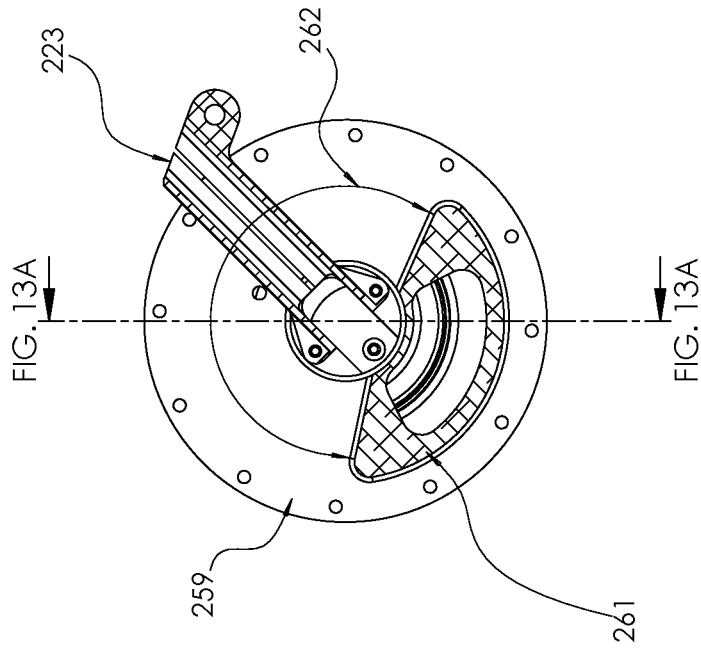
Figure 13A:
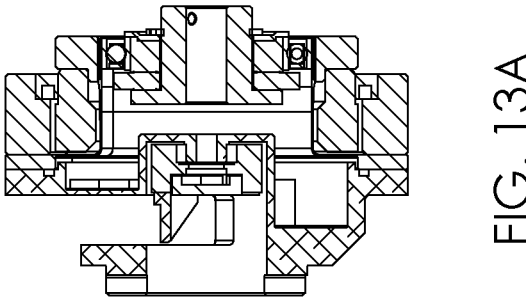
Figure 14B:
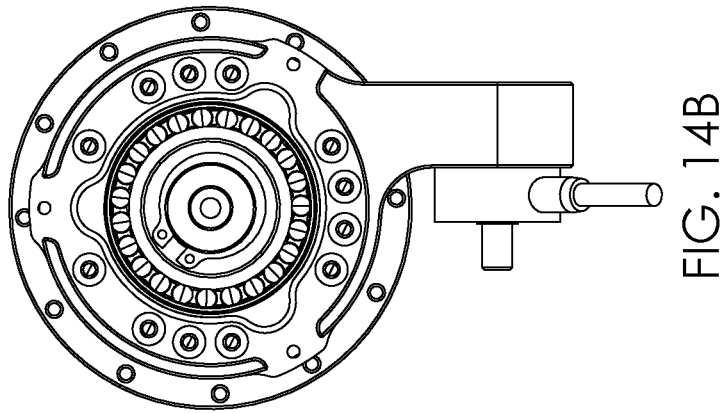
FIG. 14A provides a side view and FIG. 14B provides a front view of a sub-portion of the embodiment of FIG. 7 with a focus on a conduit having a channel that promotes wire routing internal to a rotary shaft and a linear force sensor that measures output torque of the actuator.
Figure 14A:
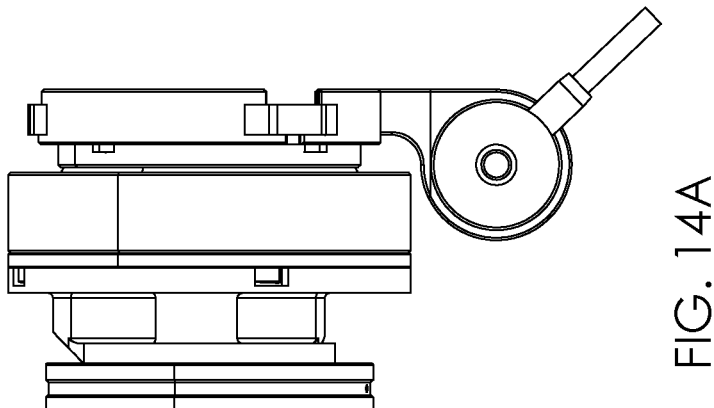
Figure 17:
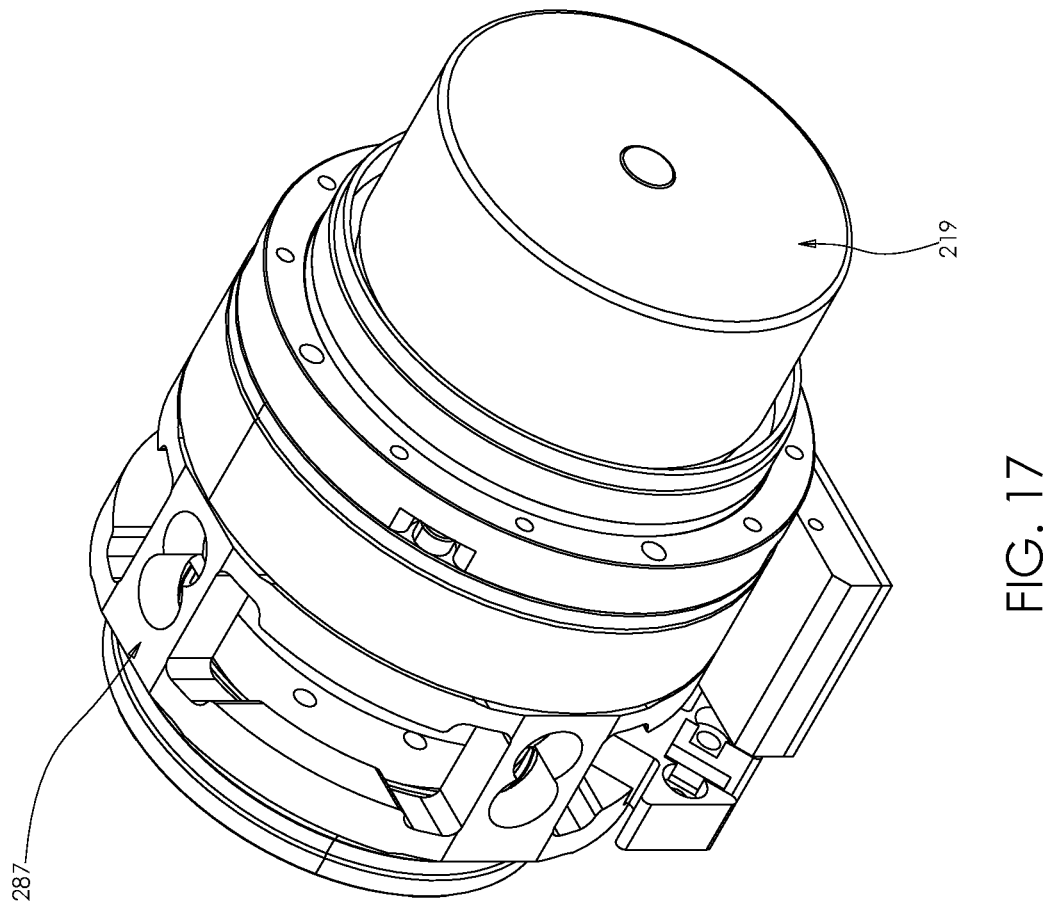
FIG. 17 includes a perspective view of an actuator that includes a compliant force sensing element integral to a strain wave reducer.
Figures 18A, 18B:
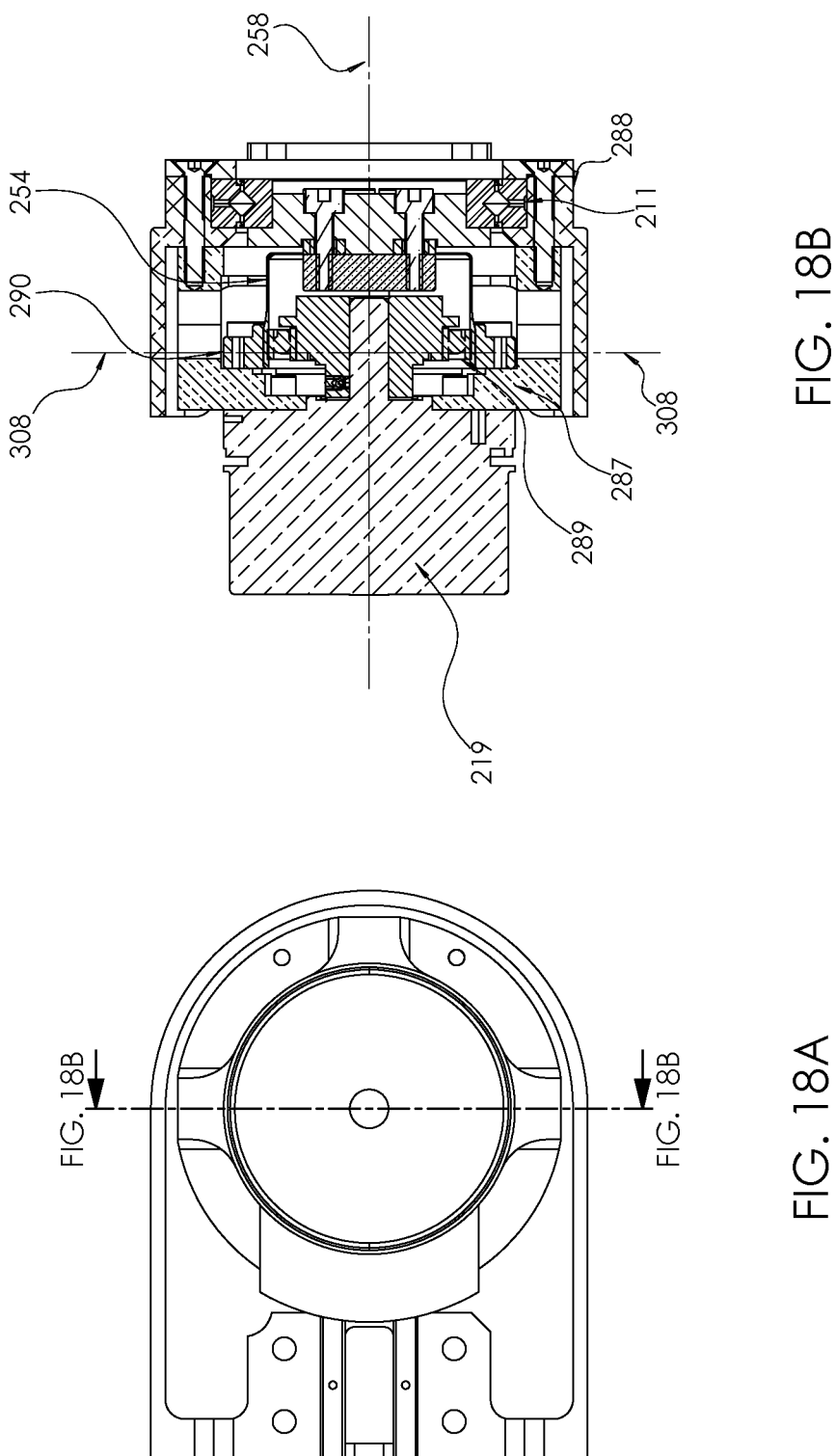
FIGS. 18A and 18B provide side and cross-sectional views of an embodiment of a compliant force sensing element.
Figures 19D, 19E:
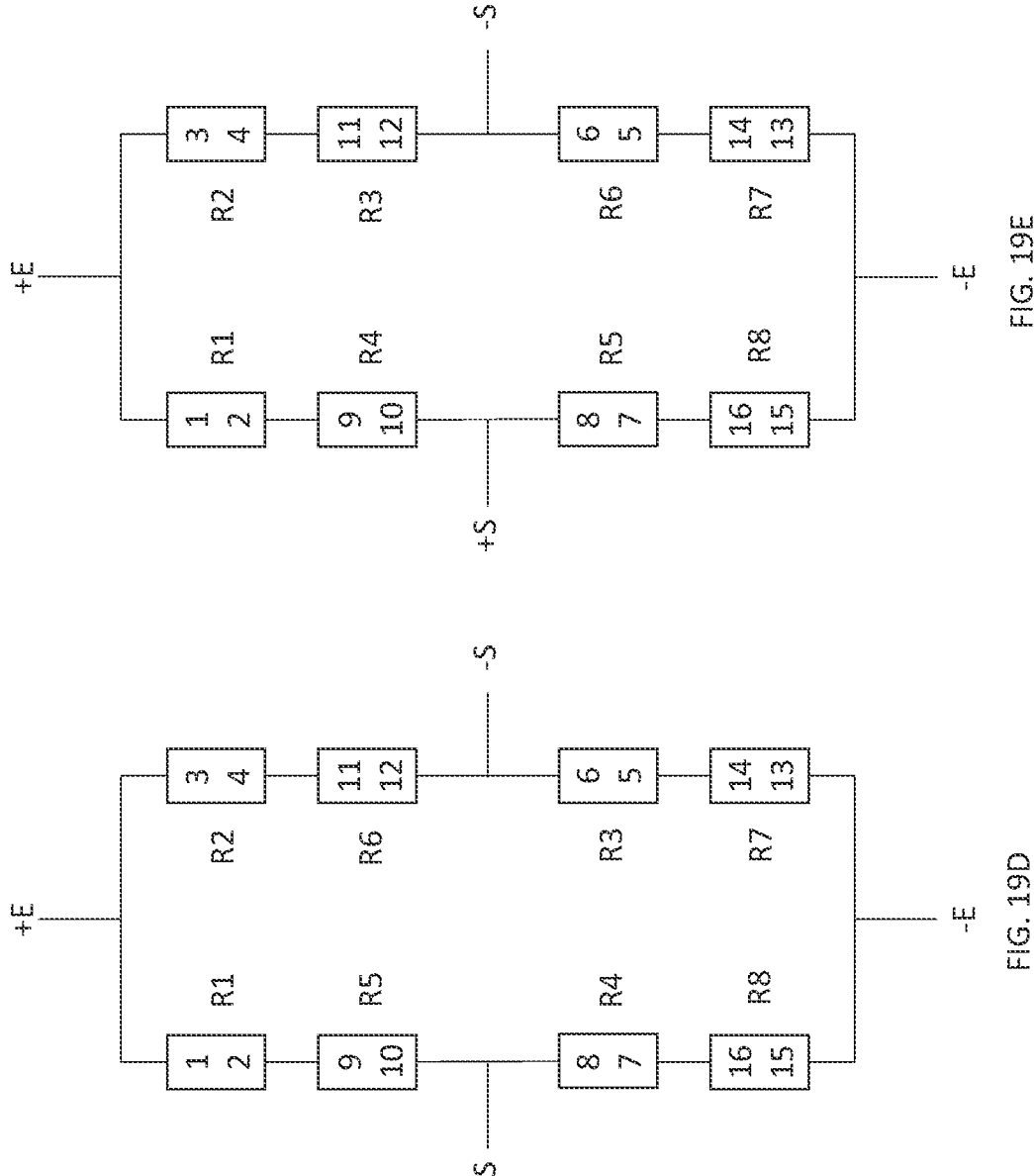
FIGS. 19D and 19E provide wiring schematics for the compliant force sensing element of FIGS. 18A and 18B.

Other elements of FIG. 8 not yet described include elements 222 (encoder locking plate), 203 (absolute encoder magnet), 230 (seal), 208 and 209 and 232 and 210 (O-ring), 214 (washer), 233 and 215 and 216 and 212 and 217 (anchors), 224 (plate), 229 (wave generator spacer), 206 (e.g., a Belleville Disc spring also described with regard to FIG. 12D although other embodiments are not limited to any specific type of spring or resilient member), 201 (bearing for encoder), 221 (encoder mount).

As seen in FIG. 15, in an embodiment the second outer wall 260 includes a first aperture 266; a second aperture 267; a first axis 268, which is parallel to the axis 258, intersects the first aperture, the first and second outer walls, and the channel but not the inner wall; a second axis 269, which is parallel to the axis, intersects the second aperture, the first and second outer walls, the channel, and the inner wall. First anchor 270 fixes the additional linkage 256 to the first aperture and second anchor 271 fixes the additional linkage 256 to the second aperture. The first anchor applies a first moment to the conduit; the second anchor applies a second moment to the conduit; and the first moment is unequal to the second moment. In an embodiment, the first anchor is tightened within the first aperture with a first level of torque; the second anchor is tightened within the second aperture with a second level of torque; the first level of torque is within +/−5% of the second level of torque. For example, each anchor may be tightened with the same level of torque. In an embodiment, system 200 includes an additional bearing 272, wherein an additional plane, orthogonal to the axis 258, intersects the additional bearing and the flexible member.

The passage immediately above addresses a method for obtaining dimensional accuracy for an asymmetrical rotary shaft in a stressed state. For example, an asymmetrical rotary shaft (e.g., conduit 220 due to wall 261 failing to have a 360 degree perimeter) is installed in an assembly 200 which requires the shaft to have dimensionally accurate features corresponding with the shaft's rotation. In the complete assembly 200 the shaft is constrained by at least one rotary bearing (e.g., see bearings 211, 272) to allow for the shaft to rotate along axis 258. In the complete assembly the asymmetrical shaft is stressed by loads which affect the dimensional accuracy of shaft features. To ensure the assembly is able to rotate without excessive wobbling, the shaft is first manufactured with features whose dimensional accuracy is unaffected by stress brought to their final geometry and features whose dimensional accuracy is affected by stress in an unfinished state. The shaft is assembled into a bearing similar to the one it will be coupled to (e.g., similar to bearing 211) in the final assembly and loads similar to those applied to the shaft in the final assembly are applied to the shaft. For example, by tightening anchors 270, 271 (FIG. 16A) the unfinished features are now deformed by the loads applied to the shaft, and this deformation is the same that would be expected of the shaft in the final assembly because all factors affecting the deformation are the same. The deformed unfinished features are machined to their final geometry while the loads are being applied to the shaft by rotating the shaft in the bearing and removing material from the rotating shaft. These newly machined features are now dimensionally accurate relative to the rotation of the shaft when the shaft is stressed in the final assembly and the desired outcome is achieved.

Thus, an embodiment includes a method for machining a shaft in the stressed state to allow for better alignment accuracy of bearing systems.

Figure 20:
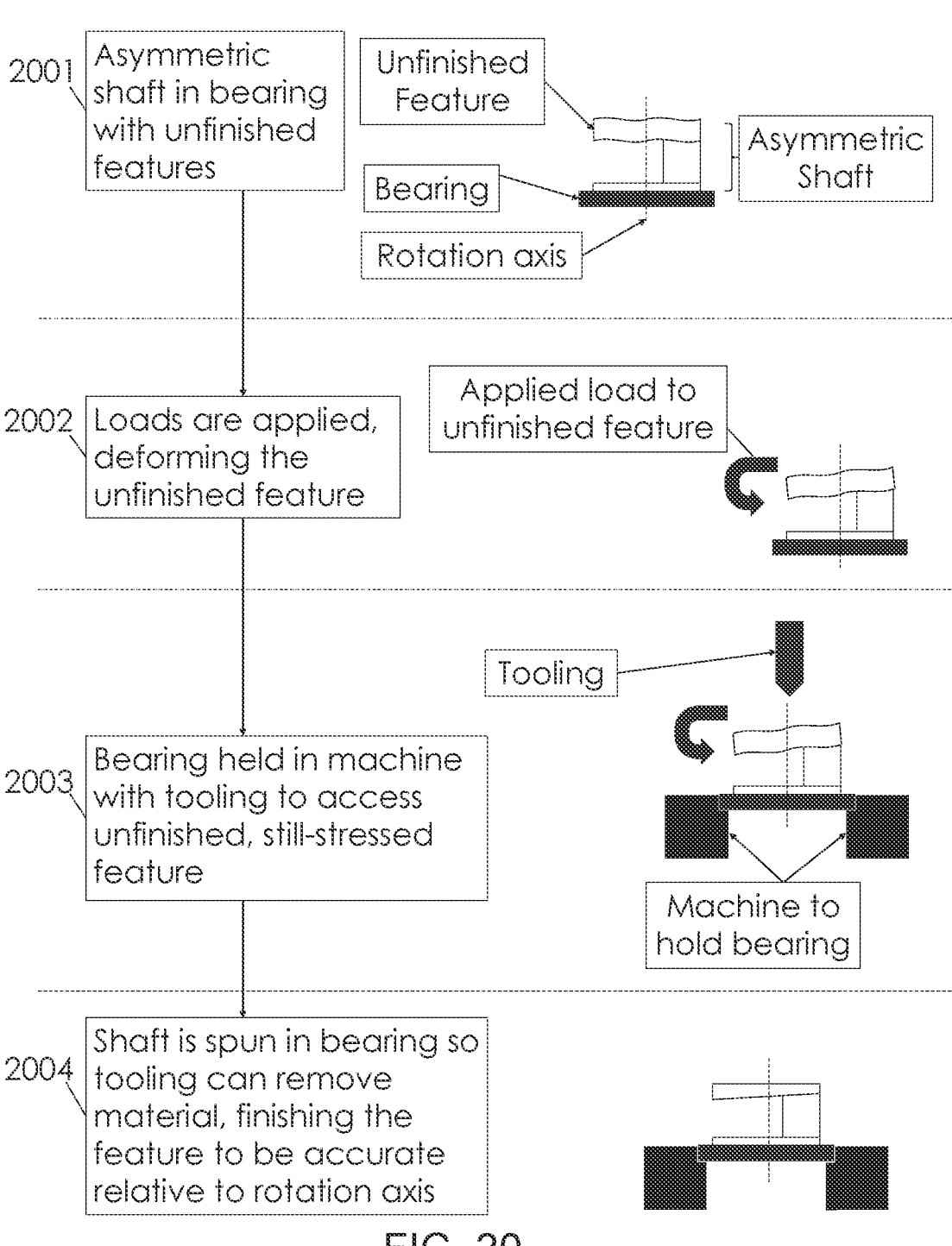
FIG. 20 provides a method in an embodiment.

A method includes (step 101) installing SEA Calibration Hub into bearing, tightening fasteners (all 6) in order (starting with fastener/anchor 271, then 304, then 301, then 303, then 302, then 270) to 3.5 Nm, click torque wrench twice for each fastener. In step 102 clamp assembly by the outer diameter of bearing 211. In step 203 part 223 is rotated to machine a consistent diameter and face 305 is flat. FIG. 20 addresses an embodiment of the method. In step 2001, conduit 220 (unfinished feature) is affixed to a bearing, such as bearing 211. Conduit 220 may have uneven surfaces that may be problematic when conduit 220 is rotated during typical functioning and/or seated directly or indirectly to a rotating feature of a drive, such as a strain wave gear. In step 2002, a load is applied to the conduit. This load may be applied via the fasteners discussed with regard to FIG. 16A.

The load may be representative of a load that will applied once linkage 256 is attached to bearing 211/conduit 220. Due to the asymmetric nature of conduit 220 (due to its channel) a deformation may occur. This deformation may be problematic when conduit 220 is rotated during typical functioning and/or seated directly or indirectly to a rotating feature of a drive, such as a strain wave gear. In step 2003 the conduit is prepared for rotation and in step 2004 the conduit is rotated and machined to smooth out its upper face (which will couple, directly or indirectly, to the drive).

In an embodiment, the assembly 200 includes a force sensor 205 configured to sense torque (indirectly) in response to rotation of the flexible member 254 in the second direction 253. Although, should motor 219 reverse course and spin in direction 253 (causing flex member 254 to spin in direction 252) the torque sensor would still be operable. In an embodiment (FIG. 8) the torque sensor is between the strain wave gear and the motor.

In the embodiment of FIG. 8 (a) the motor 219, the strain wave gear 204, the conduit 220, and the bearing 211 all couple to a housing via bracket 227; (b) the force sensor 205 (sometimes referred to as a torque sensor even though the force sensed may be a compressive or tensile force caused by torque from a stationary element of a gear such as a strain wave gear) couples the bracket to each of the motor, the strain wave gear, the conduit, and the bearing, and (c) the torque sensor couples to the conduit via the strain wave gear. An additional projection 273 couples the torque sensor to the strain wave gear. The additional projection extends orthogonal to the axis 258.

Such an embodiment provides for an arrangement of a linear force sensor to measure output torque of actuator. By arranging a linear force sensor 205 off the axis of a gearmotor 204 and attaching the linear force sensor to the stator of the gearmotor (via stator mount 226), the linear force (along axis 274) measured by the force sensor is representative of the torque output by the gearmotor. A bearing 272 is used to isolate the load cell from extraneous loads other than the torsion output by the gearmotor.

In an embodiment, a gearmotor 204 is mounted to a rotational bearing 272 whose axis is inline with the gearmotor output axis 258 such that the gearmotor assembly is free to rotate about its output axis but constrained in the other degrees of freedom. A component with a salient or protrusion 273 is fixed to the stator of the gearmotor such that the salient protrudes prominently from the circumference of the gearmotor. A linear force sensor 205 is fixed to the actuator housing (via bracket 227) and to the salient to constrain the free rotation of the gearmotor assembly allowed by the rotational bearing. The linear force measured is proportional to the actuator output torque by the distance 275 from the gearmotor axis to the force.

In the embodiment of FIGS. 12A-12D, the actuator 200 comprises first 206, second 207, third 276, and fourth 277 springs. The second spring is between the first and third springs and the third spring is between the second and fourth springs. Bracket 227 includes a projection 278; the projection is between the second and third springs; the third and fourth springs are between the projection and the torque sensor. The first spring includes a first concave face, the second spring includes a second concave face, the third spring includes a third concave face, and the fourth spring includes a fourth concave face; the first and second concave faces face opposite one another and the second and third concave faces face opposite one another. In an embodiment, each of the first, second, third, and fourth springs are non-linear compression springs.

In an embodiment the first and second springs are between a first portion 225 of an abutment and the projection 278. The third and fourth springs are between a second portion 228 of the abutment and the projection. The first and second springs are compressed and simultaneously exert force against the first portion of the abutment and the projection. The third and fourth springs are compressed and simultaneously exert force against the second portion of the abutment and the projection. In an embodiment the abutment 225, 228 has an adjustable width of a space 279 between the first portion of the abutment and the projection. In an embodiment the width of space 279 and/or space 280 (between the second portion of the abutment and the projection) is adjustable. For example, the abutment may include a threaded portion and the adjustable width of spaces 279/280 may be based on the threaded portion. For example, portion 228 may be threaded onto portion 281. Shims may also be used to adjust compression levels. In an embodiment, the abutment includes a channel 282 and a portion 283 of the torque sensor is included in the channel. In an embodiment the channel includes a long axis 284 and a plane 285, which is orthogonal to the long axis of the channel, intersects the torque sensor and the abutment.

In an embodiment the force sensor 205 is an in-line reaction torque sensor. In an embodiment the torque sensor is non-rotary. Embodiments may include varied torque sensors such as inline wireless torque cells, clamp-on torque cells, rotary cells, slip-ring cells, Thus, the above use of a spring stack provides a compliant bending joint created using linear spring stack. Angular misalignment (e.g., between axis 286 of sensor 205 and channel axis 284) is allowed for by using an arrangement of springs that is compliant to misalignment but stiff to other displacements. A compliant bending joint is created using a compression spring stack. A series stack of nonlinear compression springs with a center hole are selected such that the spring stack exerts a near constant force over a desired compression range. Two sets of nonlinear compression spring stacks are arranged on a shaft which has a narrow abutment or in a fixed housing with a narrow abutment. The springs are compressed to the center of the desired compression range by a housing or shaft with an adjustable abutment component. When angular misalignment of the shaft relative to the housing occurs, the spring stack compresses on one side and extends on the other due to the misalignment. Due to the selection of springs, the compressed and extended sides of the spring stack exert nearly the same force, thus there is only a small restoring moment forcing the shaft back into alignment. Both sets of springs exhibit this behavior and act to compress the other spring stack so that the resulting assembly has only a small restoring moment and provides large restoring forces for other displacements.

An embodiment provides an alternative the torque sensor of FIG. 8. FIGS. 19A-19E address an embodiment that includes a torque sensor 287 that couples a housing to the strain wave gear. For example, the torque sensor 287 includes a first sensor wall 292, a second sensor wall 293, and at least one coupling member 294, 295, 296, 297 to couple the first sensor wall to the second sensor wall, and at least one cable 298 to communicate electricity to the torque sensor. The torque sensor is configured to vary an electrical property of the torque sensor in response to torque being supplied to at least one of the first or second sensor walls. In an embodiment the torque sensor includes a bridge strain gauge. The strain gauge may include a Wheatstone bridge. Of course, other embodiments may utilize other forms of strain gauge.

A Wheatstone bridge is an electrical circuit used to measure an unknown electrical resistance by balancing two legs of a bridge circuit, one leg of which includes the unknown component. The primary benefit of the circuit is its ability to provide extremely accurate measurements (in contrast with something like a simple voltage divider).

In an embodiment, a plane 308, which is orthogonal to the axis, intersects the flexible member 254 and the torque gauge. In an embodiment the plane also intersects circular spline 290 and wave generator 289. In an embodiment the torque sensor is configured to vary an electrical property of the torque sensor in response to torsion being applied to the first and second sensor walls 292, 293 and the at least one coupling member 294, 295, 296, 297. The torsion is proportional to torque generated in response to rotation of the flexible member in the second direction.

The above addresses a compliant force sensing element that is integrated into the structure of a strain wave reducer by placing it between the flex spline with rotary bearing and circular spline. The strain wave component comprises a wave generator, a circular spline, and a flex spline which must be arranged in a precise manner to ensure alignment and maximum lifespan of the components. The flex spline is connected through a shaft to a rotational bearing 211 which allows the flex spline to spin freely in the axis of the flex spline. The rotational bearing is held in place by a housing 288. The circular spline 290 is connected through a torsionally flexible component 287 to the bearing housing 288. The torsionally flexible component is rigid to loads other than torsion along its axis. The torsionally flexible component is precisely mounted in the housing and to the circular spline to insure the alignment of circular spline to flex spline. The wave generator is mounted in the assembly. The torque output by the flex spline 254 to the output of the assembly is reacted by the circular spline 290. This torque acts on the torsionally flexible element 287 and causes the torsionally flexible element to angularly displace slightly. When this happens the alignment of the circular spline to the flex spline is maintained due to the component's rigidity to other loads. Angular displacement is measured by a strain gauge type sensor 287 and is converted to a torsional force. The measured torsional force is proportional to the torque output by the strain wave gear. Sensor 287 functions as a bridge strain gauge. An embodiment of wiring for the bridge is addressed in the wiring schematic of FIG. 21.

The following examples pertain to further embodiments.

Example 1. An exoskeleton system comprising: a linkage and an additional linkage; a joint coupling the linkage to the additional linkage; at least one cable; wherein the joint includes a motor having a shaft, a strain wave gear having a flexible member, a conduit, and a bearing; wherein the strain wave gear is between the motor and the conduit and the conduit is between the strain wave gear and the bearing; wherein the motor is configured to rotate the shaft in a first direction and the strain wave gear is configured to rotate the flexible member in a second direction that is opposite the first direction; wherein the conduit is configured to rotate in the second direction in response to rotation of the flexible member in the second direction; wherein the at least one cable passes through both the bearing and into the additional linkage but does not pass through either of the strain wave gear or the motor.

For example, the at least one cable may include cable 250 of FIG. 8. Such a cable may be composed of sub-cables that are connected in series or parallel with each other. Such a cable may transmit power, data, and the like. The cable may join to printed circuit boards (PCB), interconnects, communication busses, and the like. Cable 250 may extend through the aperture of bearing 211 and then into linkage 256 where it may interface a drive. Further, cable 250 may extend past motor 219 on its way to another linkage and/or controller. While the cable 250 is typically addressed herein as a cable to communicate power, data, and the like in terms of electronic communication, such a cable may instead communicate power, data, and the like in terms of hydraulics, pneumatics, and the like.

Such a controller may operate via various protocols that exist to promote automation. EtherCAT (Ethernet for Control Automation Technology) is a real-time Industrial Ethernet technology. As addressed at https://***.ethercat.org/en/technology.html#1.1, the EtherCAT protocol, which is disclosed in the IEC standard IEC61158, is suitable for hard and soft real-time requirements in automation technology, in test and measurement and many other applications. EtherCAT may allow for short cycle times ($\leq 100$ μs), low jitter for accurate synchronization ($\leq 1$ μs) and low hardware costs.

An EtherCAT master sends a telegram that passes through each node (such as PCBs in various linkages). Each EtherCAT slave device reads the data addressed to it "on the fly", and inserts its data in the frame as the frame is moving downstream. The frame is delayed only by hardware propagation delay times. The last node in a segment (or drop line) detects an open port and sends the message back to the master using Ethernet technology's full duplex feature.

The EtherCAT master is the only node within a segment allowed to actively send an EtherCAT frame; all other nodes merely forward frames downstream. This concept prevents unpredictable delays and guarantees real-time capabilities.

The master uses a standard Ethernet Media Access Controller (MAC) without an additional communication processor. This allows a master to be implemented on any hardware platform with an available Ethernet port, regardless of which real-time operating system or application software is used. EtherCAT Slave devices use an EtherCAT Slave Controller (ESC) to process frames on the fly and entirely in hardware, making network performance predictable and independent of the individual slave device implementation.

While EtherCAT is used above to explain one way in which actuator embodiments addressed herein may be controlled, the actuator embodiments may instead be controlled via other electronic protocols, hydraulic systems, pneumatic systems, and the like.

Cable 250 may transmit program instructions. Program instructions may be used to cause a general-purpose or special-purpose processing system that is programmed with the instructions to perform the operations described herein (e.g., move a linkage). Alternatively, the operations may be performed by specific hardware components that contain hardwired logic for performing the operations, or by any combination of programmed computer components and custom hardware components. Methods for controlling actuator and/or linkage embodiments described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, and the like. Program code may be transmitted in the form of packets, serial data, parallel data, and the like, and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

Example 2. The system of example 1 wherein: the conduit is configured to rotate about an axis; the conduit comprises: (a) a first outer wall with a perimeter that extends at least 270 degrees about the axis; (b) a second outer wall with a perimeter that extends at least 270 degrees about the axis; (c) an inner wall with a perimeter that extends less than 180 degrees about the axis and which couples the first and second outer walls to each other; and (c) the first and second outer walls and the inner wall collectively define a channel that extends more than 180 degrees about the axis; a plane, which is orthogonal to the axis, intersects the inner wall and the channel but not the first outer wall and not the second outer wall.

Example 2.1 The system of example 2 wherein the at least one cable: (a) passes through the channel; (b) passes away from the bearing, around the outer wall, and towards the motor; and (c) does not pass through the outer wall.

Example 3. The system of example 2.1 wherein: the cable is mounted in a static orientation; the channel is configured to rotate with the conduit about the axis in response to rotation of the flexible member in the second direction.

Example 4. The system of example 3 including an angle sensor configured to sense rotation of the conduit about the axis in response to rotation of the flexible member in the second direction.

Example 5. The system of example 4 wherein an additional plane, which is orthogonal to the axis, intersects the angle sensor and the conduit.

Example 6. The system of example 5 wherein the angle sensor is an absolute rotary encoder.

Example 7. The system of example 5 wherein the angle sensor is configured to collect data based on rotation of the conduit.

Example 8. The system of example 5 comprising an additional at least one cable that: (a) is coupled to the angle sensor and is included in the channel; (b) passes away from the bearing, around the outer wall, and towards the motor; and (c) does not pass through the outer wall.

Example 9. The system of example 8 comprising an additional conduit that: (a) is included within the channel, and (b) includes the at least one cable and the additional at least one cable.

Example 10. The system of example 9 wherein: the additional conduit is statically mounted to a housing of the linkage; the additional conduit is configured to remain statically mounted to the housing and not rotate with the conduit about the axis in response to rotation of the flexible member in the second direction.

Example 11. The system of example 9 wherein: the additional conduit is monolithic with a compartment; the compartment includes at least a portion of the angle sensor.

Example 11.1 The system of example 2 wherein the second outer wall includes: a first aperture; a second aperture; a first axis, which is parallel to the axis, intersects the first aperture, the first and second outer walls, and the channel but not the inner wall; a second axis, which is parallel to the axis, intersects the second aperture, the first and second outer walls, the channel, and the inner wall.

Example 11.2 The system of example 11.1 comprising first and second anchors, wherein: the first anchor fixes the additional linkage to the first aperture; the second anchor fixes the additional linkage to the second aperture.

Example 11.3 The system of example 11.2 wherein: the first anchor applies a first moment to the conduit; the second anchor applies a second moment to the conduit; the first moment is unequal to the second moment.

Example 11.4 The system of example 11.3 wherein: the first anchor is tightened within the first aperture with a first level of torque; the second anchor is tightened within the second aperture with a second level of torque; the first level of torque is within +/−5% of the second level of torque.

Example 11.5 The system of example 11.4 comprising an additional bearing, wherein an additional plane, orthogonal to the axis, intersects the additional bearing and the flexible member.

Example 12. The system of example 3 including a torque sensor configured to sense torque in response to rotation of the flexible member in the second direction.

Example 13. The system of example 12 wherein the torque sensor is between the strain wave gear and the motor.

Example 14. The system of example 12 comprising a housing of the linkage; wherein: (a) the motor, the strain wave gear, the conduit, and the bearing all couple to the housing via a bracket; (b) the torque sensor couples the bracket to each of the motor, the strain wave gear, the conduit, and the bearing.

Example 15. The system of example 14 wherein the torque sensor couples to the conduit via the strain wave gear.

Example 16. The system of example 12 comprising first, second, third, and fourth springs, wherein: the second spring is between the first and third springs and the third spring is between the second and fourth springs; the bracket includes a projection; the projection is between the second and third springs; the third and fourth springs are between the projection and the torque sensor.

Example 17. The system of example 16 comprising an additional projection that couples the torque sensor to the strain wave gear, wherein the additional projection extends orthogonal to the axis.

Example 18. The system of example 16 wherein: the first spring includes a first concave face, the second spring includes a second concave face, the third spring includes a third concave face, and the fourth spring includes a fourth concave face; the first and second concave faces face opposite one another and the second and third concave faces face opposite one another.

Example 19. The system of example 16 wherein each of the first, second, third, and fourth springs are non-linear compression springs.

Example 20. The system of example 19 comprising an abutment, wherein: the first and second springs are between a first portion of the abutment and the projection; the third and fourth springs are between a second portion of the abutment and the projection; the first and second springs are compressed and simultaneously exert force against the first portion of the abutment and the projection; the third and fourth springs are compressed and simultaneously exert force against the second portion of the abutment and the projection.

Example 21. The system of example 20 wherein the abutment has an adjustable width of a space between the first portion of the abutment and the projection.

Example 22. The system of example 20 wherein the abutment has an adjustable width of a space between the second portion of the abutment and the projection.

Example 23. The system of 21 wherein the abutment includes a threaded portion and the adjustable width of a space between the first portion of the abutment and the projection is adjustable based on the threaded portion.

Example 24. The system of 20 wherein: the abutment includes a channel; a portion of the torque sensor is included in the channel.

Example 25. The system of example 24 wherein: the channel includes a long axis; a plane, which is orthogonal to the long axis of the channel, intersects the torque sensor and the abutment.

Example 26. The system of example 12 wherein the torque sensor is an in-line reaction torque sensor.

Example 27. The system of example 19 wherein the torque sensor is non-rotary.

Example 28. The system of example 12 comprising a housing, wherein the torque sensor couples the housing to the strain wave gear.

Example 29. The system of example 28 wherein: the torque sensor includes a first sensor wall, a second sensor wall, and at least one coupling member to couple the first sensor wall to the second sensor wall; at least one cable to communicate electricity to the torque sensor.

Example 30. The system of example 29 wherein the torque sensor is configured to vary an electrical property of the torque sensor in response to torque being supplied to at least one of the first or second sensor walls.

Example 31. The system of example 30 wherein the torque sensor includes a bridge strain gauge.

Example 32. The system of example 31 wherein an additional plane, which is orthogonal to the axis, intersects the flexible member and the torque gauge.

Example 33. The system of example 29 wherein: the torque sensor is configured to vary an electrical property of the torque sensor in response to torsion being applied to the first and second sensor walls and the at least one coupling member; the torsion is proportional to torque generated in response to rotation of the flexible member in the second direction.

Example 1a: A robotic system comprising: a linkage and an additional linkage; a joint coupling the linkage to the additional linkage; at least one cable; wherein the joint includes a motor having a shaft, a strain wave gear having a flexible member, a conduit, and a bearing; wherein the strain wave gear is between the motor and the conduit and the conduit is between the strain wave gear and the bearing; wherein the motor is configured to rotate the shaft in a first direction and the strain wave gear is configured to rotate the flexible member in a second direction that is opposite the first direction; wherein the conduit is configured to rotate in the second direction in response to rotation of the flexible member in the second direction; wherein the at least one cable passes through both the bearing and into the additional linkage but does not pass through either of the strain wave gear or the motor.

Another version of Example 1a. A robotic system comprising: a linkage and an additional linkage; a joint coupling the linkage to the additional linkage; at least one cable; wherein the joint includes a motor having a shaft, a strain wave gear having an output member, a conduit, and a bearing; wherein the strain wave gear is between the motor and the conduit and the conduit is between the strain wave gear and the bearing; wherein the motor is configured to rotate the shaft in a first direction and the strain wave gear is configured to rotate the output member; wherein the conduit is configured to rotate in response to rotation of the output member; wherein the at least one cable passes through both the bearing and into the additional linkage but does not pass through either of the strain wave gear or the motor.

Thus, rotating output member of a strain wave gear may include the flexible spline or the rigid spline.

Another version of Example 1a. A robotic system comprising: a linkage and an additional linkage; a joint coupling the linkage to the additional linkage; at least one cable; wherein the joint includes a motor having a shaft, a strain wave gear having a flexible member coupled to a circular spline, a conduit, and a bearing; wherein the strain wave gear is between the motor and the conduit and the conduit is between the strain wave gear and the bearing; wherein the motor is configured to rotate the shaft in a first direction and the strain wave gear is configured to rotate the circular spline in a second direction that is opposite the first direction; wherein the conduit is configured to rotate in the second direction in response to rotation of the circular spline in the second direction; wherein the at least one cable passes through both the bearing and into the additional linkage but does not pass through either of the strain wave gear or the motor.

Thus, embodiments may use a strain wave gear in an "inverted" mode whereby the circular spline rotates instead of the flexible spline.

Another version of example 1a. An exoskeleton system comprising: a linkage and an additional linkage; a joint coupling the linkage to the additional linkage; at least one cable; wherein the joint includes a motor having a shaft, a strain wave gear having a flexible member and a non-rotating member, a conduit, and a bearing; wherein the strain wave gear is between the motor and the conduit and the conduit is between the strain wave gear and the bearing; wherein the motor is configured to rotate the shaft in a first direction and the strain wave gear is configured to rotate the flexible member in a second direction that is opposite the first direction; wherein the conduit is configured to rotate in the second direction in response to rotation of the flexible member in the second direction; wherein the at least one cable passes through both the bearing and into the additional linkage but does not pass through either of the strain wave gear or the motor.

Another version of example 1a. A robotic system comprising: a linkage and an additional linkage; a joint coupling the linkage to the additional linkage; at least one cable; wherein the joint includes a motor having a shaft, a speed reducer, a conduit, and a bearing; wherein the speed reducer includes one of a strain wave speed reducer, a cycloidal speed reducer, or a planetary speed reducer; wherein the speed reducer is between the motor and the conduit and the conduit is between the speed reducer and the bearing; wherein the conduit is configured to rotate in response to rotation of the speed reducer; wherein the at least one cable passes through both the bearing and into the additional linkage but does not pass through either of the speed reducer or the motor.

A speed reducer is, for example, between a motor and the output. The reducer is used to reduce the speed with which power is transmitted.

Embodiments are not limited to drives such as strain wave gears and may instead operate based on pneumatic or hydraulic actuation. Further, drives may be used that do not incorporate speed reducers. For example, a strain wave gear without speed reduction capacity may be used.

Strain wave gearing (also known as harmonic gearing) is a type of mechanical gear system that can improve certain characteristics compared to traditional gearing systems such as helical gears or planetary gears. The advantages include: no or limited backlash, compactness and light weight, high gear ratios, reconfigurable ratios within a standard housing, good resolution and excellent repeatability when repositioning inertial loads, high torque capability, and coaxial input and output shafts. High gear reduction ratios are possible in a small volume.

An embodiment may omit a mechanical gear system and instead more directly couple a shaft of the motor to conduit 220.

An embodiment may include an input that coupled to the motor shaft, a stator that is connected to the housing of the first linkage (directly or through a load cell), and an output coupled to the conduit 220.

Example 2a. The system of example 1a wherein: the conduit is configured to rotate about an axis; the conduit comprises: (a) a first outer wall with a perimeter that extends at least 270 degrees about the axis; (b) a second outer wall with a perimeter that extends at least 270 degrees about the axis; (c) an inner wall with a perimeter that extends less than 180 degrees about the axis and which couples the first and second outer walls to each other; and (c) the first and second outer walls and the inner wall collectively define a channel that extends more than 180 degrees about the axis; a plane, which is orthogonal to the axis, intersects the inner wall and the channel but not the first outer wall and not the second outer wall.

Example 2.1a. The system of example 2a wherein the at least one cable: (a) passes through the channel; (b) passes away from the bearing, around the outer wall, and towards the motor; and (c) does not pass through the outer wall.

Example 3a. The system of example 2.1a wherein: the cable is mounted in a static orientation; the channel is configured to rotate with the conduit about the axis in response to rotation of the flexible member in the second direction.

Another version of Example 3a. The system of example 2.1a wherein: the cable is mounted in a static orientation; the channel is configured to rotate with the conduit about the axis in response to rotation of the circular spline in the second direction.

Another version of Example 3a. The system of example 2.1a wherein: the cable is mounted in a static orientation; the channel is configured to rotate with the conduit about the axis in response to rotation of the speed reducer.

Example 4a. The system of example 3a including an angle sensor configured to sense rotation of the conduit about the axis in response to rotation of the flexible member in the second direction.

Another version of Example 4a. The system of example 3a including an angle sensor configured to sense rotation of the conduit about the axis in response to rotation of the circular spline member in the second direction.

Another version of Example 4a. The system of example 3a including an angle sensor configured to sense rotation of the conduit about the axis in response to rotation of the speed reducer.

Example 5a. The system of example 4a wherein an additional plane, which is orthogonal to the axis, intersects the angle sensor and the conduit.

Example 6a. The system of example 5a wherein the angle sensor is an absolute rotary encoder.

Example 7a. The system of example 5a wherein the angle sensor is configured to collect data based on rotation of the conduit.

Example 8a. The system of example 5a comprising an additional at least one cable that: (a) is coupled to the angle sensor and is included in the channel; (b) passes away from the bearing, around the outer wall, and towards the motor; and (c) does not pass through the outer wall.

Example 9a. The system of example 8a comprising an additional conduit that: (a) is included within the channel, and (b) includes the at least one cable.

Another version of Example 9a. The system of example 2a comprising an additional conduit that: (a) is included within the channel, and (b) includes the at least one cable.

Example 10a. The system of example 9a wherein: the additional conduit is statically mounted to a housing of the linkage; the additional conduit is configured to remain statically mounted to the housing and not rotate with the conduit about the axis in response to rotation of the flexible member in the second direction.

Another version of Example 10a. The system of example 9a wherein: the additional conduit is statically mounted to a housing of the linkage; the additional conduit is configured to remain statically mounted to the housing and not rotate with the conduit about the axis in response to rotation of the circular spline in the second direction.

Another version of Example 10a. The system of example 9a wherein: the additional conduit is statically mounted to a housing of the linkage; the additional conduit is configured to remain statically mounted to the housing and not rotate with the conduit about the axis in response to rotation of the speed reducer.

Example 11a. The system of example 9a wherein: the additional conduit is monolithic with a compartment; the compartment includes at least a portion of the angle sensor.

Example 11.1a. The system of example 2a wherein the second outer wall includes: a first aperture; a second aperture; a first axis, which is parallel to the axis, intersects the first aperture, the first and second outer walls, and the channel but not the inner wall; a second axis, which is parallel to the axis, intersects the second aperture and the inner wall but not the channel.

Another version of Example 11.1a The system of example 2a wherein the second outer wall includes: a first aperture; a second aperture; a first axis, which is parallel to the axis, intersects the first aperture, the first and second outer walls, and the channel but not the inner wall; a second axis, which is parallel to the axis, intersects the second aperture, the first and second outer walls, and the channel but not the inner wall; wherein the first axis is a first distance from a location on the inner wall, the second axis is a second distance from the location on the inner wall, and the first distance is unequal to the second distance.

Example 11.2a The system of example 11.1a comprising first and second anchors, wherein: the first anchor fixes the additional linkage to the first aperture; the second anchor fixes the additional linkage to the second aperture.

Example 11.3a The system of example 11.2a wherein: the first anchor applies a first moment to the conduit; the second anchor applies a second moment to the conduit; the first moment is equal to the second moment.

Example 11.4a The system of example 11.3a wherein: the first anchor is tightened within the first aperture with a first level of torque; the second anchor is tightened within the second aperture with a second level of torque; the first level of torque is within +/−10% of the second level of torque.

Another version of Example 11.4a The system of example 11.2a wherein: an additional plane, orthogonal to the axis, intersects the bearing; (a)(i) the first outer wall has a first outer wall face and a first inner wall face, (a)(ii) the first inner wall face is between the channel and the first outer wall face; in a first configuration: (c)(i) the first anchor is tightened within the first aperture with a first level of torque and the second anchor is tightened within the second aperture with the first level of torque; (c)(ii) a first distance, extending orthogonal to the additional plane and a third distance from the axis, exists between the first outer wall face and the additional plane, (c)(iii) a second minimum distance, extending orthogonal to the additional plane and the third distance from the axis, exists between the first outer wall face and the additional plane; (c)(iv) the first distance is radially offset, with respect to the axis, from the second distance; (c)(v) the first distance is unequal to the second distance; in a second configuration: (c)(i) the first anchor is tightened within the first aperture with a second level of torque and the second anchor is tightened within the second aperture with the second level of torque; (c)(ii) the first distance is equal to the second distance; and (c)(iii) the second level of torque is greater than the first level of torque.

For example, in FIG. 15 the first distance may be distance 307 and the second distance may be distance 306. The third distance may be taken orthogonal to axis 258 and extend from axis 258 to distance 307 (and again to distance 306). In other words, forces applied at equal radial distances from axis 258.

The first level of torque may be 0 Nm (and the distances 306, 307 are uneven due to the asymmetrical nature of the conduit and its channel) but when the torque is applied at level similar to actual operation conditions (e.g., second level of torque) the distances 306, 307 even out.

Example 11.5a The system of example 11.4a comprising an additional bearing, wherein an additional plane, orthogonal to the axis, intersects the additional bearing and the flexible member.

Another version of Example 11.5a. The system of example 11.4a comprising an additional bearing, wherein an additional plane, orthogonal to the axis, intersects the additional bearing and the speed reducer.

Example 12a. The system of example 3a including a torque sensor configured to sense torque in response to rotation of the flexible member in the second direction.

Another version of Example 12a. The system of example 3a including a torque sensor configured to sense torque transmitted via the circular spline of the strain wave gear.

Another version of Example 12a. The system of example 3a including a force sensor configured to sense force transmitted via a circular spine of the strain wave gear.

Another version of Example 12a. The system of example 3a including a force sensor configured to sense force transmitted via the speed reducer.

Example 13a. The system of example 12a wherein the torque sensor is between the strain wave gear and the motor.

Another version of Example 13a The system of example 12a wherein the torque sensor is between the strain wave gear and a housing of the first linkage.

Another version of Example 13a The system of example 12a wherein the force sensor is between the strain wave gear and a housing of the first linkage.

Another version of Example 13a The system of example 12a wherein the force sensor is between the speed reducer and a housing of the first linkage.

Example 14a. The system of example 12a comprising a housing of the linkage; wherein: (a) the motor, the strain wave gear, the conduit, and the bearing all couple to the housing via a bracket; (b) the torque sensor couples the bracket to each of the motor, the strain wave gear, the conduit, and the bearing.

Another version of Example 14a. The system of example 12a comprising a housing of the linkage; wherein: (a) a circular spline of the strain wave gear couples to a bracket via the torque sensor; (b) the torque sensor couples to the housing via the bracket.

Another version of Example 14a. The system of example 12a comprising a housing of the linkage; wherein: (a) a circular spline of the strain wave gear couples to a bracket via the force sensor; (b) the force sensor couples to the housing via the bracket.

Another version of Example 14a. The system of example 12a comprising a housing of the linkage; wherein: (a) speed reducer couples to a bracket via the force sensor; (b) the force sensor couples to the housing via the bracket.

Example 15a. The system of example 14a wherein the torque sensor couples to the conduit via the strain wave gear.

Another version of Example 15a. The system of example 14a wherein the force sensor couples to the conduit via the strain wave gear.

Another version of Example 15a. The system of example 14a wherein the force sensor couples to the conduit via the speed reducer.

Example 16a. The system of example 14a comprising first, second, third, and fourth springs, wherein: the second spring is between the first and third springs and the third spring is between the second and fourth springs; the bracket includes a projection; the projection is between the second and third springs; the third and fourth springs are between the projection and the torque sensor.

For example, the springs may include Belleville springs. A Belleville washer/spring, also known as a coned-disc spring, conical spring washer, disc spring, Belleville spring or cupped spring washer, is a conical shell which can be loaded along its axis either statically or dynamically. A Belleville washer is a type of spring shaped like a washer. It is the frusto-conical shape that gives the washer its characteristic spring.

Another version of Example 16a. The system of example 14a comprising first, second, third, and fourth springs, wherein: the second spring is between the first and third springs and the third spring is between the second and fourth springs; the bracket includes a projection; the projection is between the second and third springs; the third and fourth springs are between the projection and the force sensor.

Another version of Example 16a. The system of example 14a comprising first, second, third, and fourth resilient members, wherein: the second resilient member is between the first and third resilient members and the third resilient member is between the second and fourth resilient members; the bracket includes a projection; the projection is between the second and third resilient members; the third and fourth resilient members are between the projection and the force sensor.

Another version of Example 16a. The system of example 14a comprising additional first, additional second, additional third, and additional fourth springs, wherein: the additional second spring is between the additional first and additional third springs and the additional third spring is between the additional second and additional fourth springs; an additional projection couples the force sensor to the strain wave gear; the additional projection is between the additional second and additional third springs; the additional third and additional fourth springs are between the additional projection and the force sensor.

Thus, as shown in FIG. 8, there may be a set of four springs on one side of the sensor (with springs on both sides of bracket 227) and another set of four springs on another side of the sensor (with springs on both sides of bracket 273).

Example 17a. The system of example 16a comprising an additional projection that couples the torque sensor to the strain wave gear, wherein the additional projection extends orthogonal to the axis.

Another version of Example 17a. The system of example 16a comprising an additional projection that couples the force sensor to the strain wave gear, wherein the additional projection extends orthogonal to the axis.

Another version of Example 17a. The system of example 16a comprising an additional projection that couples the force sensor to the strain wave gear, wherein the additional projection extends away from the axis.

Another version of Example 17a. The system of example 16a comprising an additional projection that couples the force sensor to the speed reducer, wherein the additional projection extends away from the axis.

Example 18a. The system of example 16a wherein: the first spring includes a first concave face, the second spring includes a second concave face, the third spring includes a third concave face, and the fourth spring includes a fourth concave face; the first and second concave faces face opposite one another and the second and third concave faces face opposite one another.

Another version of Example 18a. The system of example 16a wherein: the first resilient member includes a first concave face, the second resilient member includes a second concave face, the third spring includes a third resilient member face, and the fourth resilient member includes a fourth concave face; the first and second concave faces face opposite one another and the second and third concave faces face opposite one another.

Example 19a. The system of example 16a wherein each of the first, second, third, and fourth springs are non-linear compression springs.

Another version of Example 19a. The system of example 16a wherein at least one of the first, second, third, or fourth springs is a non-linear compression spring.

Example 20a. The system of example 19a comprising an abutment, wherein: the first and second springs are between a first portion of the abutment and the projection; the third and fourth springs are between a second portion of the abutment and the projection; the first and second springs are compressed and simultaneously exert force against the first portion of the abutment and the projection; the third and fourth springs are compressed and simultaneously exert force against the second portion of the abutment and the projection.

Another version of Example 20a. The system of example 16a comprising an abutment, wherein: the first and second resilient members are between a first portion of the abutment and the projection; the third and fourth resilient members are between a second portion of the abutment and the projection; the first and second resilient members are compressed and simultaneously exert force against the first portion of the abutment and the projection; the third and fourth resilient members are compressed and simultaneously exert force against the second portion of the abutment and the projection.

Example 21a. The system of example 20a wherein the abutment has an adjustable width of a space between the first portion of the abutment and the projection.

Example 22a. The system of example 20a wherein the abutment has an adjustable width of a space between the second portion of the abutment and the projection.

Example 23a. The system of Example 21a wherein the abutment includes a threaded portion and the adjustable width of a space between the first portion of the abutment and the projection is adjustable based on the threaded portion.

Example 24a. The system of Example 20a wherein: the abutment includes a channel; a portion of the torque sensor is included in the channel.

Another version of Example 24a. The system of example 20a wherein: the abutment includes a channel; a portion of the force sensor is included in the channel.

Another version of Example 24. The system of Example 20a wherein the abutment is adjacent a portion of the force sensor. Thus, the channel 282 and its reception of a portion of the sensor is not required in all embodiments.

Example 25a. The system of example 24a wherein: the channel includes a long axis; a plane, which is orthogonal to the long axis of the channel, intersects the torque sensor and the abutment.

Another version of Example 25a. The system of example 24a wherein: the channel includes a long axis; a plane, which is orthogonal to the long axis of the channel, intersects the force sensor and the abutment.

Another version of Example 25a. The system of example 24a wherein a long axis of the force sensor intersects central voids of the first, second, third, and fourth springs.

The long axis may be the axis with which linear forces acts (tension or compression).

Example 26a. The system of example 12a wherein the torque sensor is an in-line reaction torque sensor.

Another version of Example 26a. The system of example 12a wherein the force sensor is an in-line reaction force sensor.

Another version of Example 26a. The system of example 12a wherein the force sensor is an in-line force sensor.

Another version of Example 26a. The system of example 12a wherein the force sensor is an in-line compression and tension force sensor.

Example 27a. The system of example 19a wherein the torque sensor is non-rotary.

Another version of Example 27a. The system of example 19a wherein the force sensor is non-rotary.

Example 28a. The system of example 12a comprising a housing, wherein the torque sensor couples the housing to the strain wave gear.

Another version of Example 28a. The system of example 12a comprising a housing, wherein the force sensor couples the housing to the strain wave gear.

Another version of Example 28a. The system of example 12a comprising a housing, wherein the force sensor couples the housing to the speed reducer.

Another version of Example 28a. The system of example 12a comprising a housing, wherein the force sensor couples the housing to a non-rotary portion of the speed reducer.

Another version of Example 28a. The system of example 12a comprising a housing, wherein the force sensor couples the housing to a non-rotary portion of the strain wave gear.

Another version of Example 28a. The system of example 12a wherein the non-rotating member of the strain wave gear is coupled to housing of the linkage through a torque sensing element.

Example 28.1a The system of example 28a wherein the torque sensing element maintains alignment between axes of the rotating and non-rotating members of the strain wave reducer without the use of an additional bearing between the rotating and non-rotating members of the strain wave reducer.

Example 29a. The system of example 28a wherein: the torque sensor includes a first sensor wall, a second sensor wall, and at least one coupling member to couple the first sensor wall to the second sensor wall; at least one cable to communicate electricity to the torque sensor.

Another version of Example 29a. The system of example 28a wherein: the force sensor includes a first sensor wall, a second sensor wall, and at least one coupling member to couple the first sensor wall to the second sensor wall; at least one cable to communicate electricity to the force sensor.

Another version of Example 29a. The system of example 28a wherein: the force sensor includes a first sensor wall, a second sensor wall, and at least one coupling member to couple the first sensor wall to the second sensor wall; at least one cable to communicate data from the force sensor.

Example 30a. The system of example 29a wherein the torque sensor is configured to vary an electrical property of the torque sensor in response to torque being supplied to at least one of the first or second sensor walls.

Another version of Example 30a. The system of example 29a wherein the force sensor is configured to vary an electrical property of the torque sensor in response to torque being supplied to at least one of the first or second sensor walls.

Example 31a. The system of example 30a wherein the torque sensor includes a bridge strain gauge.

Another version of Example 31a. The system of example 30a wherein the force sensor includes a bridge strain gauge.

Another version of Example 31a. The system of example 30a wherein the force sensor includes at least one strain gauge.

Another version of Example 31a. The system of example 30a wherein the force sensor includes at least one strain gauge arranged in a bridge configuration.

Another version of Example 31a. The system of example 30a wherein the force sensor includes at least one strain gauge arranged in a Wheatstone bridge configuration.

Example 32a. The system of example 31a wherein an additional plane, which is orthogonal to the axis, intersects the flexible member and the torque gauge.

Another version of Example 32a. The system of example 31a wherein an additional plane, which is orthogonal to the axis, intersects the flexible member and the force gauge.

Example 33a. The system of example 29a wherein: the torque sensor is configured to vary an electrical property of the torque sensor in response to torsion being applied to the first and second sensor walls and the at least one coupling member; the torsion is proportional to torque generated in response to rotation of the flexible member in the second direction.

Another version of Example 33a. The system of example 29a wherein: the force sensor is configured to vary an electrical property of the force sensor in response to torsion being applied to the first and second sensor walls and the at least one coupling member; the torsion is proportional to torque generated in response to rotation of the flexible member in the second direction.

Another version of Example 33a. The system of example 29a wherein: the force sensor is configured to vary an electrical property of the force sensor in response to torsion being applied to the first and second sensor walls and the at least one coupling member; the torsion is proportional to torque generated in response to rotation of the circular spline member in the second direction.

Another version of Example 33a. The system of example 29a wherein: the force sensor is configured to vary an electrical property of the force sensor in response to torsion being applied to the first and second sensor walls and the at least one coupling member; the torsion is proportional to torque generated in response to rotation of the speed reducer.

Example 1b. A robotic system comprising: a linkage and an additional linkage; a joint coupling the linkage to the additional linkage; and at least one cable; wherein the joint includes a motor having a shaft, a strain wave gear having a flexible member coupled to a circular spline, a conduit, and a bearing; wherein the strain wave gear is between the motor and the conduit and the conduit is between the strain wave gear and the bearing; wherein the motor is configured to rotate the shaft in a first direction and the strain wave gear is configured to rotate a rotatable member, the rotatable member including one of the flexible member or the circular spline; wherein the conduit is configured to rotate in response to rotation of the rotatable member; wherein the at least one cable passes through both the bearing and into the additional linkage but does not pass through either of the strain wave gear or the motor.

Example 2b. The system of example 1b wherein: the conduit is configured to rotate about an axis; the conduit comprises: (a) a first outer wall with a perimeter that extends at least 270 degrees about the axis; (b) a second outer wall with a perimeter that extends at least 270 degrees about the axis; (c) an inner wall with a perimeter that extends less than 180 degrees about the axis and which couples the first and second outer walls to each other; wherein the first and second outer walls and the inner wall collectively define a channel that extends more than 180 degrees about the axis;

wherein a plane, which is orthogonal to the axis, intersects the inner wall and the channel but not the first outer wall and not the second outer wall.

Example 3b. The system according to any of examples 1b-2b wherein: the cable is mounted in a static orientation; the channel is configured to rotate with the conduit about the axis in response to rotation of the rotatable member.

Example 4b. The system according to any of examples 1b-3b including an angle sensor configured to sense rotation of the conduit about the axis in response to rotation of the rotatable member.

Example 5b. The system of example 4b wherein an additional plane, which is orthogonal to the axis, intersects the angle sensor and the conduit.

Example 6b. The system according to any of examples 4b-5b comprising an additional at least one cable that: (a) is coupled to the angle sensor and is included in the channel; (b) passes away from the bearing, around the first outer wall, and towards the motor; and (c) does not pass through the first outer wall.

Example 7b. The system according to any of examples 1b-6b comprising an additional conduit that is included within the channel and includes the at least one cable.

Example 8b. The system of example 7b wherein: the additional conduit is statically mounted to a housing of the linkage; the additional conduit is configured to remain statically mounted to the housing and not rotate with the conduit about the axis in response to rotation of the rotatable member.

Example 9b. The system according to any of examples 1b-8b wherein: the rotatable member includes the flexible member; the strain wave gear is configured to rotate the rotatable member in a second direction; the conduit is configured to rotate in the second direction in response to (a) rotation of the rotatable member in the second direction and (b) rotation of the shaft in the first direction; the second direction is opposite the first direction.

Example 10b. The system according to any of examples 2b-9b wherein the second outer wall includes: a first aperture included in the second outer wall; a second aperture included at least one of the second outer wall or the inner wall; a first axis, which is parallel to the axis, intersects the first aperture, the second outer wall, and the channel but not the inner wall; a second axis, which is parallel to the axis, intersects the second aperture and the inner wall but not the channel.

Example 11b. The system of example 10b comprising first and second anchors, wherein: the first anchor fixes the additional linkage to the first aperture; the second anchor fixes the additional linkage to the second aperture.

Example 12b. The system of example 11b wherein: an additional plane, orthogonal to the axis, intersects the bearing; (a)(i) the first outer wall has a first outer wall face and a first inner wall face, (a)(ii) the first inner wall face is between the channel and the first outer wall face; in a first configuration: (c)(i) the first anchor is tightened within the first aperture with a first level of torque and the second anchor is tightened within the second aperture with the first level of torque; (c)(ii) a first distance, extending orthogonal to the additional plane and a third distance from the axis, exists between the first outer wall face and the additional plane, (c)(iii) a second distance, extending orthogonal to the additional plane and extending the third distance from the axis, exists between the first outer wall face and the additional plane; (c)(iv) the first distance is radially offset, with respect to the axis, from the second distance; (c)(v) the first distance is unequal to the second distance; in a second configuration: (c)(i) the first anchor is tightened within the first aperture with a second level of torque and the second anchor is tightened within the second aperture with the second level of torque; (c)(ii) the first distance is equal to the second distance; and (c)(iii) the second level of torque is greater than the first level of torque.

Example 13b. The system according to any of examples 1b-12b comprising an additional bearing, wherein an additional plane, orthogonal to the axis, intersects the additional bearing and the flexible member.

Example 14b. The system according to any of examples 1b-13b including a force sensor configured to sense force transmitted via a non-rotatable member of the strain wave gear, the non-rotatable member including another of the flexible member or the circular spline.

Example 15b. The system of example 14b wherein the force sensor is between the strain wave gear and a housing of the first linkage.

Example 16b. The system of example 14b comprising a housing of the linkage; wherein: (a) the non-rotatable member couples to a bracket via the force sensor; (b) the force sensor couples to the housing via the bracket.

Example 17b. The system of example 16b wherein the force sensor couples to the conduit via the strain wave gear.

Example 18b. The system of example 16b comprising first, second, third, and fourth springs, wherein: the second spring is between the first and third springs and the third spring is between the second and fourth springs; the bracket includes a projection; the projection is between the second and third springs; the third and fourth springs are between the projection and the force sensor.

Example 19b. The system of example 16b comprising an additional projection that couples the force sensor to the strain wave gear, wherein the additional projection extends away from the axis.

Example 20b. The system of example 19b comprising an abutment, wherein: the first and second springs are between a first portion of the abutment and the projection; the third and fourth springs are between a second portion of the abutment and the projection; the first and second springs are compressed and simultaneously exert force against the first portion of the abutment and the projection; the third and fourth springs are compressed and simultaneously exert force against the second portion of the abutment and the projection.

Example 21b. The system of example 14b wherein the force sensor is an in-line force sensor.

Example 22b. The system according to any of examples 1b-13b wherein a non-rotatable member is coupled to a housing of the linkage through a torque sensor, the non-rotatable member including another of the flexible member or the circular spline.

Example 23b. The system of example 22b wherein: the torque sensor includes a first sensor wall, a second sensor wall, and at least one coupling member to couple the first sensor wall to the second sensor wall; at least one additional cable to communicate data from the torque sensor.

Example 24b. The system of example 23b wherein the torque sensor is configured to vary an electrical property of the torque sensor in response to torque being supplied to at least one of the first or second sensor walls.

Example 25b. The system of example 24b wherein the torque sensor includes at least one strain gauge arranged in a bridge configuration.

Example 1c. A robotic system comprising: a linkage and an additional linkage; a joint coupling the linkage to the additional linkage; and at least one cable; wherein the joint includes a motor having a shaft, a strain wave gear having a flexible member coupled to a circular spline, a conduit, and a bearing; wherein the strain wave gear is between the motor and the conduit and the conduit is between the strain wave gear and the bearing; wherein the motor is configured to rotate the shaft in a first direction and the strain wave gear is configured to rotate a rotatable member, the rotatable member including one of the flexible member or the circular spline; wherein the conduit is configured to rotate in response to rotation of the rotatable member; wherein the at least one cable passes through both the bearing and into the additional linkage but does not pass through either of the strain wave gear or the motor.

For example, the strain wave gear being between the motor and the conduit means operatively (i.e., the motor connects to the conduit via the gear).

Example 2c. The system of example 1c wherein: the conduit is configured to rotate about an axis; the conduit comprises: (a) a first outer wall with a perimeter that extends at least 270 degrees about the axis; (b) a second outer wall with a perimeter that extends at least 270 degrees about the axis; (c) an inner wall with a perimeter that extends less than 180 degrees about the axis and which couples the first and second outer walls to each other; wherein the first and second outer walls and the inner wall collectively define a channel that extends more than 180 degrees about the axis; wherein a plane, which is orthogonal to the axis, intersects the inner wall and the channel but not the first outer wall and not the second outer wall.

Example 3c. The system of example 2c wherein: the cable is mounted in a static orientation; the channel is configured to rotate with the conduit about the axis in response to rotation of the rotatable member.

Example 4c. The system of example 3c including an angle sensor configured to sense rotation of the conduit about the axis in response to rotation of the rotatable member.

Example 5c. The system of example 4c wherein an additional plane, which is orthogonal to the axis, intersects the angle sensor and the conduit.

Example 6c. The system of example 5c comprising an additional at least one cable that: (a) is coupled to the angle sensor and is included in the channel; (b) passes away from the bearing, around the first outer wall, and towards the motor; and (c) does not pass through the first outer wall.

Example 7c. The system of example 2c comprising an additional conduit that is included within the channel and includes the at least one cable.

As used herein, a conduit does not necessarily entail a circular cross-section of even a contiguous 260 degree perimeter.

Example 8c. The system of example 7c wherein: the additional conduit is statically mounted to a housing of the linkage; the additional conduit is configured to remain statically mounted to the housing and not rotate with the conduit about the axis in response to rotation of the rotatable member.

Example 9c. The system of example 2c wherein: the rotatable member includes the flexible member; the strain wave gear is configured to rotate the rotatable member in a second direction; the conduit is configured to rotate in the second direction in response to (a) rotation of the rotatable member in the second direction and (b) rotation of the shaft in the first direction; the second direction is opposite the first direction.

Example 10c. The system of example 2c wherein the second outer wall includes: a first aperture included in the second outer wall; a second aperture included at least one of the second outer wall or the inner wall; a first axis, which is parallel to the axis, intersects the first aperture, the second outer wall, and the channel but not the inner wall; a second axis, which is parallel to the axis, intersects the second aperture and the inner wall but not the channel.

Another version of Example 10c. The system of example 2c wherein the second outer wall includes: a first aperture included in the second outer wall; a second aperture included at least one of the second outer wall or the inner wall; a first axis, which is parallel to the axis, intersects the first aperture, the second outer wall, and the channel but not the inner wall; a second axis, which is parallel to the axis, intersects the second aperture but not the channel.

Example 11c. The system of example 10c comprising first and second anchors, wherein: the first anchor fixes the additional linkage to the first aperture; the second anchor fixes the additional linkage to the second aperture.

Example 12c. The system of example 11c wherein: an additional plane, orthogonal to the axis, intersects the bearing; (a)(i) the first outer wall has a first outer wall face and a first inner wall face, (a)(ii) the first inner wall face is between the channel and the first outer wall face; in a first configuration: (c)(i) the first anchor is tightened within the first aperture with a first level of torque and the second anchor is tightened within the second aperture with the first level of torque; (c)(ii) a first distance, extending orthogonal to the additional plane and a third distance from the axis, exists between the first outer wall face and the additional plane, (c)(iii) a second distance, extending orthogonal to the additional plane and extending the third distance from the axis, exists between the first outer wall face and the additional plane; (c)(iv) the first distance is radially offset, with respect to the axis, from the second distance; (c)(v) the first distance is unequal to the second distance; in a second configuration: (c)(i) the first anchor is tightened within the first aperture with a second level of torque and the second anchor is tightened within the second aperture with the second level of torque; (c)(ii) the first distance is equal to the second distance; and (c)(iii) the second level of torque is greater than the first level of torque.

Example 13c. The system of example 11c comprising an additional bearing, wherein an additional plane, orthogonal to the axis, intersects the additional bearing and the flexible member.

Example 14c. The system of example 3c including a force sensor configured to sense force transmitted via a non-rotatable member of the strain wave gear, the non-rotatable member including another of the flexible member or the circular spline.

Example 15c. The system of example 14c wherein the force sensor is between the strain wave gear and a housing of the first linkage.

Example 16c. The system of example 14c comprising a housing of the linkage; wherein: (a) the non-rotatable member couples to a bracket via the force sensor; (b) the force sensor couples to the housing via the bracket.

Example 17c. The system of example 16c wherein the force sensor couples to the conduit via the strain wave gear.

Example 18c. The system of example 16c comprising first, second, third, and fourth springs, wherein: the second spring is between the first and third springs and the third spring is between the second and fourth springs; the bracket includes a projection; the projection is between the second and third springs; the third and fourth springs are between the projection and the force sensor.

Example 19c. The system of example 16c comprising an additional projection that couples the force sensor to the strain wave gear, wherein the additional projection extends away from the axis.

Example 20c. The system of example 18c comprising an abutment, wherein: the first and second springs are between a first portion of the abutment and the projection; the third and fourth springs are between a second portion of the abutment and the projection; the first and second springs are compressed and simultaneously exert force against the first portion of the abutment and the projection; the third and fourth springs are compressed and simultaneously exert force against the second portion of the abutment and the projection.

Example 21c. The system of example 14c wherein the force sensor is an in-line force sensor.

Example 22c. The system of example 2c wherein a non-rotatable member is coupled to a housing of the linkage through a torque sensor, the non-rotatable member including another of the flexible member or the circular spline.

Example 23c. The system of example 22c wherein: the torque sensor includes a first sensor wall, a second sensor wall, and at least one coupling member to couple the first sensor wall to the second sensor wall; at least one additional cable to communicate data from the torque sensor.

Example 24c. The system of example 23c wherein the torque sensor is configured to vary an electrical property of the torque sensor in response to torque being supplied to at least one of the first or second sensor walls.

Example 25c. The system of example 24c wherein the torque sensor includes at least one strain gauge arranged in a bridge configuration.

Embodiments provide various improvements over conventional systems such as (1) wire routing internal to rotary shaft with an inaccessible end (internal wire routing reduces actuator footprint over non internal routing), (2) arrangement of linear force sensor to measure output torque of actuator (Linear force sensors are more abundant commercially and cost less than torsional torque sensors, Attachment footprint is smaller than commercial torque sensors), (3) Compliant bending joint created using spring stack (Compact length compared to rod ends, Zero clearance misalignment bearing, geometry and dimensional accuracy are critical to actuator function and actuator will not preform desirably without allowance for angular misalignment of the force sensor), (4) Compliant force sensing element integral to strain wave reducer (Compact integration of force sensor into actuator assembly, Simple design requiring few machined components), (5) Process for ensuring positional accuracy of a component constrained by set of rotational bearings (Actuator assemblies using a linear force sensor face issues with force sensing accuracy related to the motion between the two housings for the two bearings around the actuator output shaft, Process improves force sensing accuracy over shafts not machined by this method, geometry and dimensional accuracy are critical to actuator function and actuator will not preform desirably without allowance for angular misalignment of the bearings in the assembly).

Embodiments are applicable for use in human interfacing robots with force sensing rotary actuators. Force sensing ability is crucial to safety, ensuring that the robot does not exert excessive force and harm a person. The actuator's ability to sense the force exerted by the actuator is useful for creating records of interaction, which may have uses in medical fields such as physical therapy. Embodiments may be useful in any field involving (1) wire routing internal to rotary shaft with an inaccessible end—integrating wires into shafts attached to gearmotors without through holes and where required output range of motion is less than 360 degrees, (2) arrangement of linear force sensor to measure output torque of actuator—creating force measuring gearmotor actuators, (3) compliant bending joint created using linear spring stack—applications where small angular misalignment is required in a compact footprint, (4) compliant force sensing element integral to strain wave reducer—useful for creating force measuring gearmotor actuators, (5) process for ensuring positional accuracy of a component constrained by set of rotational bearings—useful for improving the accuracy of force measurements in force sensing actuators and/or useful for extending the lifespan of bearings in robotic/industrial applications.

While actuators may be sold or delivered in robotic systems (e.g., included within a robotic system) the actuators and parts thereof may be shipped or delivered without robotic systems. For example, actuators may be shipped alone as replacement parts. Parts of the actuators may be shipped alone as replacement parts.

Embodiments of the actuator are different than existing industrial actuators and series elastic actuators typically used in human interfacing robots. Industrial robots typically use actuators rigid in every degree of freedom and series elastic actuators intentionally include an elastic element to allow for compliance in the output rotation. Embodiments, however, combine design goals from both industrial and serial elastic actuators and are distinct from both.

Improvements include wire routing internal to rotary shaft with an inaccessible end. Industrial robots typically need large range of motion in joints and need wire passthrough techniques that allow for greater rotation than is possible using this method. For application in the medical field, the requirement for joint range of motion is typically less than 180 degrees which allows for wire pass through embodiments.

Improvements include arrangement of linear force sensor to measure output torque of actuator. Series elastic actuators typically measure the displacement of their elastic element, which is on the output side of the gearmotor. The arrangement of an embodiment places the torque sensing unit on the stator side of the gearmotor which is beneficial for reliability. Series elastic actuators which have load sensing on the stator side of the gearmotor typically mount the entire gearmotor with the load cell—this introduces extra loading on the force sensor which impacts load reading accuracy. By using a rotary bearing to constrain the gearmotor, only the torsional load is allowed to act on the linear force sensor which provides for more accurate load readings and better reliability. Conventional systems do not adequately cover load sensing based off the stator side of a gearmotor using strain gauge measurement. An embodiment allows for closer integration of a force sensor with a gearmotor unit to form a complete and modular actuator unit for robotic applications.

Improvements include compliant bending joint created using linear spring stack. Angular misalignment is typically allowed for by spherical bearings which have the disadvantage of friction and backlash/clearance. In precision applications angular misalignment can be tolerated by flexures. However, flexures require complex assembly or machining operations to create the desired behavior and depending on the design restoring moments can be large. A spring stack described herein is more compact than spherical bearings, has no or limited backlash, is easy to assemble, and has a low restoring moment.

Improvements include compliant force sensing element integral to strain wave reducer. Typical strain wave component sets are held in alignment by rigid housings and a rotational bearing to allow for the relative rotation of the circular spline and flex spline. By replacing one of the rigid housings with an element flexible in the axis of the strain wave reducer, alignment of strain wave components is maintained, and the flexure of the flexible element can be measured for a torque measurement.

Improvements include a process for ensuring positional accuracy of a component constrained by set of rotational bearings. Typical machining operations on rigid shafts are enough to maintain adequate alignment of rotational bearings. In the case of flexible shafts, flexure of the bearing seat surface due to loads on the shaft may be too large to maintain adequate alignment of the bearings. This flexure cannot be compensated for using simple machining methods. However, an embodiment process addresses this issue.

Embodiments are more closely integrated with a gearmotor for applications where tight integration is necessary. Close integration is desirable for miniaturization, complexity reduction, and cost reduction. Conventional systems achieve a lesser result due to the larger and bulkier assembly in a robotic application, which have adverse effects on overall robot performance.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a side of a substrate is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A robotic system comprising:
a first linkage and a second linkage;
a joint coupling the first linkage to the second linkage; and
at least one cable;
wherein the joint includes a motor having a shaft, a strain wave gear having a circular spline, a first conduit, and a bearing;
wherein the motor is configured to rotate the shaft in a first direction;
wherein the at least one cable passes through the bearing and into the second linkage but does not pass through either of the strain wave gear or the motor;

wherein the first conduit is configured to rotate about a longitudinal axis;
wherein (a) the strain wave gear is distal to the motor and proximal to the first conduit, (b) the first conduit is proximal to the bearing, and (c) the second linkage is distal to the first linkage;
wherein the first conduit comprises: (a) a first outer wall; (b) a second outer wall; (c) an inner wall which couples the first and second outer walls to each other; and
wherein the first and second outer walls and the inner wall collectively define a channel that extends about the longitudinal axis;
wherein a plane, which is orthogonal to the longitudinal axis, intersects the inner wall and the channel.

2. The system of claim 1 wherein the at least one cable is mounted in a substantially static orientation.

3. The system of claim 2 wherein the at least one cable is configured to remain substantially statically mounted and not rotate with the first conduit about the longitudinal axis.

4. The system of claim 2 including an angle sensor configured to sense rotation of the first conduit about the longitudinal axis.

5. The system of claim 4 wherein:
the plane does not intersect the first outer wall and does not intersect the second outer wall;
the channel is configured to rotate with the first conduit about the longitudinal axis.

6. The system of claim 5 wherein an additional plane, which is orthogonal to the longitudinal axis, intersects the angle sensor and the first conduit.

7. The system of claim 5 comprising an additional at least one cable that: (a) is coupled to the angle sensor and is included in the channel; (b) passes away from the bearing, around the first outer wall, and towards the motor; and (c) does not pass through the first outer wall.

8. The system of claim 5 comprising a second conduit that is included within the channel and includes the at least one cable, wherein:
the second conduit is statically mounted to a housing of the first linkage; and
the second conduit is configured to remain statically mounted to the housing and not rotate with the first conduit about the longitudinal axis.

9. The system of claim 5 wherein:
the second outer wall includes a first aperture;
a second aperture is included at least one of the second outer wall or the inner wall;
a first axis, which is parallel to the longitudinal axis, intersects the first aperture, the second outer wall, and the channel but not the inner wall; and
a second axis, which is parallel to the longitudinal axis, intersects the second aperture and the inner wall but not the channel.

10. The system of claim 9 comprising first and second anchors, wherein:
the first anchor fixes the second linkage to the first aperture; and
the second anchor fixes the second linkage to the second aperture.

11. The system of claim 10 wherein:
an additional plane, orthogonal to the longitudinal axis, intersects the bearing;
(a)(i) the first outer wall has a first outer wall face and a first inner wall face, (a)(ii) the first inner wall face is between the channel and the first outer wall face;
in a first configuration: (b)(i) the first anchor is tightened within the first aperture with a first level of torque and the second anchor is tightened within the second aperture with the first level of torque; (b)(ii) a first distance, extending orthogonal to the additional plane and a third distance from the longitudinal axis, exists between the first outer wall face and the additional plane, (b)(iii) a second distance, extending orthogonal to the additional plane and extending the third distance from the longitudinal axis, exists between the first outer wall face and the additional plane; (b)(iv) the first distance is radially offset, with respect to the longitudinal axis, from the second distance; (b)(v) the first distance is unequal to the second distance;

in a second configuration: (c)(i) the first anchor is tightened within the first aperture with a second level of torque and the second anchor is tightened within the second aperture with the second level of torque; (c)(ii) the first distance is equal to the second distance; and (c)(iii) the second level of torque is greater than the first level of torque.

12. The system of claim 5 comprising an additional bearing, wherein an additional plane, orthogonal to the longitudinal axis, intersects the additional bearing.

13. The system of claim 2 wherein:

the strain wave gear has a flexible member coupled to the circular spline;

the strain wave gear is to rotate the flexible member in a second direction;

the first conduit is configured to rotate in the second direction in response to (a) rotation of the flexible member in the second direction, and (b) rotation of the shaft in the first direction; and the second direction is opposite the first direction.

14. The system of claim 1:

wherein the strain wave gear has a flexible member coupled to the circular spline;

wherein the strain wave gear is configured to rotate a first of the flexible member or the circular spline;

wherein the system comprises a force sensor configured to sense force transmitted via a second of the flexible member or the circular spline.

15. The system of claim 14 wherein the force sensor is between the strain wave gear and a housing of the first linkage.

16. The system of claim 14 comprising a housing of the first linkage;

wherein: (a) the second of the flexible member or the circular spline couples to a bracket via the force sensor; (b) the force sensor couples to the housing via the bracket.

17. The system of claim 16 wherein the force sensor couples to the first conduit via the strain wave gear.

18. The system of claim 14 wherein the force sensor is an in-line force sensor.

19. The system of claim 1 comprising a robotic exoskeleton configured to couple to a human, the exoskeleton including the joint and the first linkage and second linkages.

20. The system of claim 1 wherein:

the strain wave gear has a flexible member coupled to the circular spline;

the strain wave gear is configured to rotate a first of the flexible member or the circular spline;

a second of the flexible member or the circular spline is coupled to a housing of the first linkage through a torque sensor.

* * * * *